(12) United States Patent
Toillon et al.

(10) Patent No.: US 12,135,663 B2
(45) Date of Patent: Nov. 5, 2024

(54) METHOD, EQUIPMENT, COMMUNICATION PROGRAM, ON-BOARD DEVICE HAVING THESE EQUIPMENTS

(71) Applicant: Safran Electronics & Defense, Paris (FR)

(72) Inventors: Patrice Toillon, Moissy-Cramayel (FR); Thiebault Jeandon, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 184 days.

(21) Appl. No.: 17/868,425

(22) Filed: Jul. 19, 2022

(65) Prior Publication Data
US 2023/0028344 A1    Jan. 26, 2023

(30) Foreign Application Priority Data

Jul. 20, 2021 (FR) ..................................... 2107814

(51) Int. Cl.
*G06F 13/42* (2006.01)
*G06F 13/36* (2006.01)
*H04L 67/12* (2022.01)

(52) U.S. Cl.
CPC .............. *G06F 13/36* (2013.01); *H04L 67/12* (2013.01); *G06F 2213/40* (2013.01)

(58) Field of Classification Search
CPC ..... G06F 13/36; G06F 2213/40; H04L 67/12; H04L 2012/40267; H04L 2012/4028; H04L 12/417
See application file for complete search history.

(56) References Cited

U.S. PATENT DOCUMENTS

| | | | |
|---|---|---|---|
| 7,356,018 B2 * | 4/2008 | Seyama | H04L 63/108 370/449 |
| 10,235,523 B1 * | 3/2019 | Keller, III | G06F 13/4282 |

(Continued)

FOREIGN PATENT DOCUMENTS

EP    2632208 A1    8/2013

*Primary Examiner* — Henry Tsai
*Assistant Examiner* — Kim T Huynh
(74) *Attorney, Agent, or Firm* — BIRCH, STEWART, KOLASCH & BIRCH, LLP

(57) ABSTRACT

The invention relates to a method for communicating data between communication equipments, where the first communication equipment (EqptN) is put into the emission mode (Xmit) for the frame (TrN) containing its identification (D_PID), while each second communication equipment (Eqpt1, EqptN+1, EqptN+x) is put into the receiving mode (Rcv), then the equipment (EqptN) is put into the receiving mode (Rcv),

- each equipment (Eqpt1, EqptN+1, EqptN+x) prescribes its local emission window (Ftle1, FtleN+1, FtleN+x), which is associated with its identification, during which it is put into the emission mode (Xmit) for its frame,
- a time of beginning (IDF1, IDFN+1, IDFN+X) of the window being a determined function, increasing with respect to a difference equal to its identification from which the identification (D_PID) is subtracted,
- each equipment is put into the emission mode, during which it emits its frame containing its identification during its window starting at the beginning time.

16 Claims, 15 Drawing Sheets

(56) References Cited

U.S. PATENT DOCUMENTS

| | | | |
|---|---|---|---|
| 2012/0028675 A1* | 2/2012 | Lee | H04W 36/18 |
| | | | 455/525 |
| 2019/0313446 A1 | 10/2019 | Kim et al. | |
| 2019/0363991 A1 | 11/2019 | Sostawa et al. | |
| 2023/0028344 A1* | 1/2023 | Toillon | G06F 13/36 |

* cited by examiner

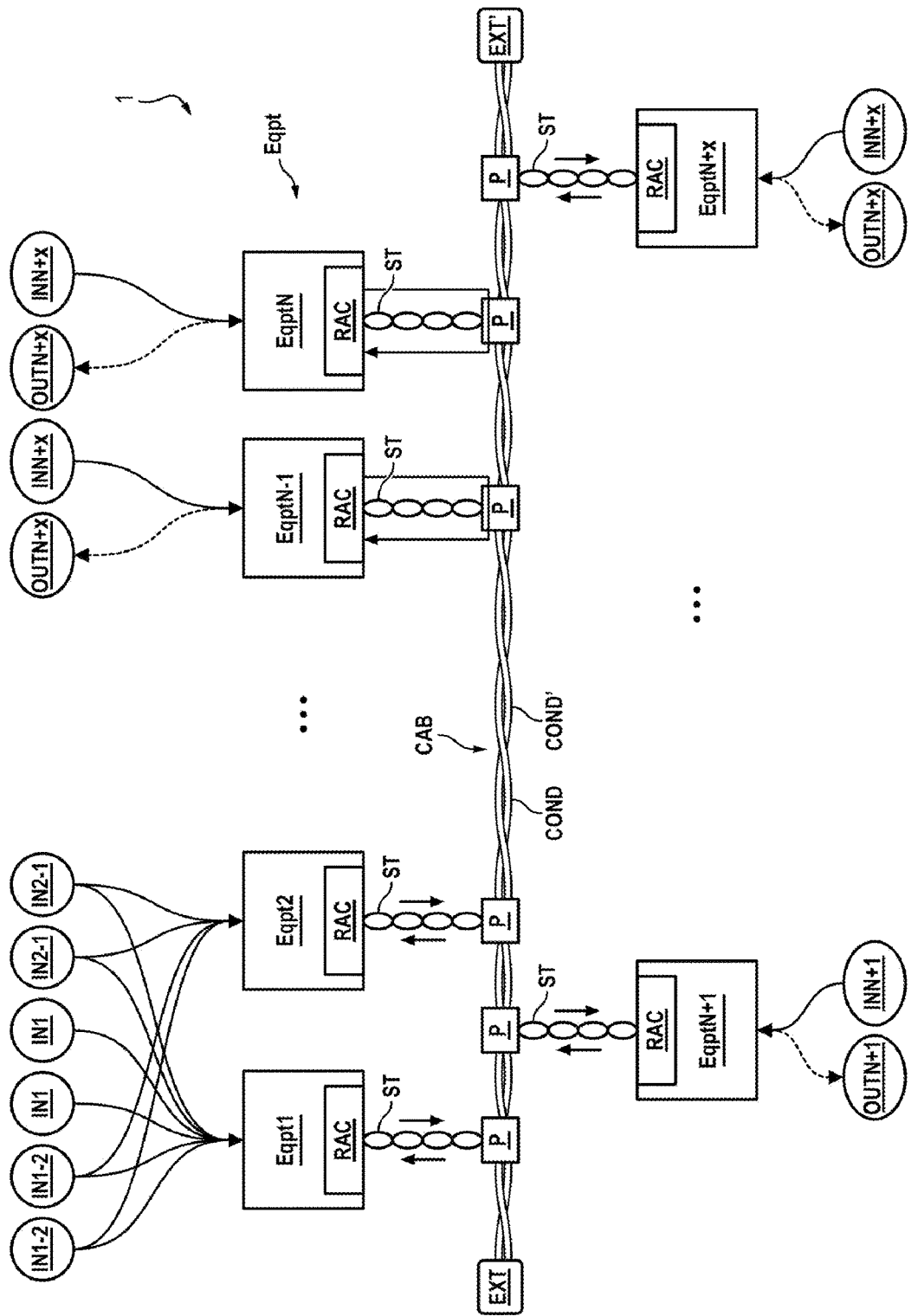
[Fig. 1]

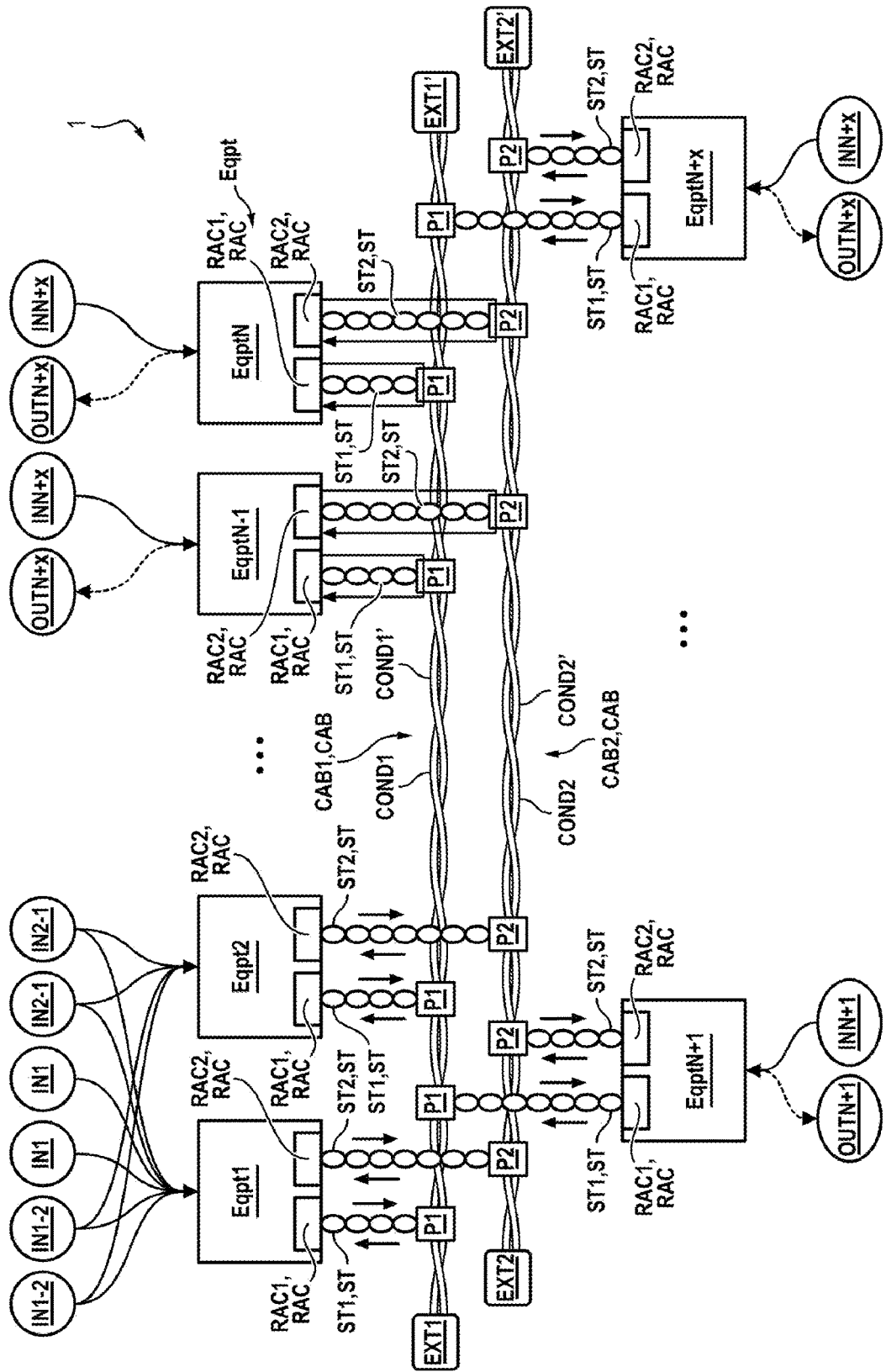
[Fig. 2]

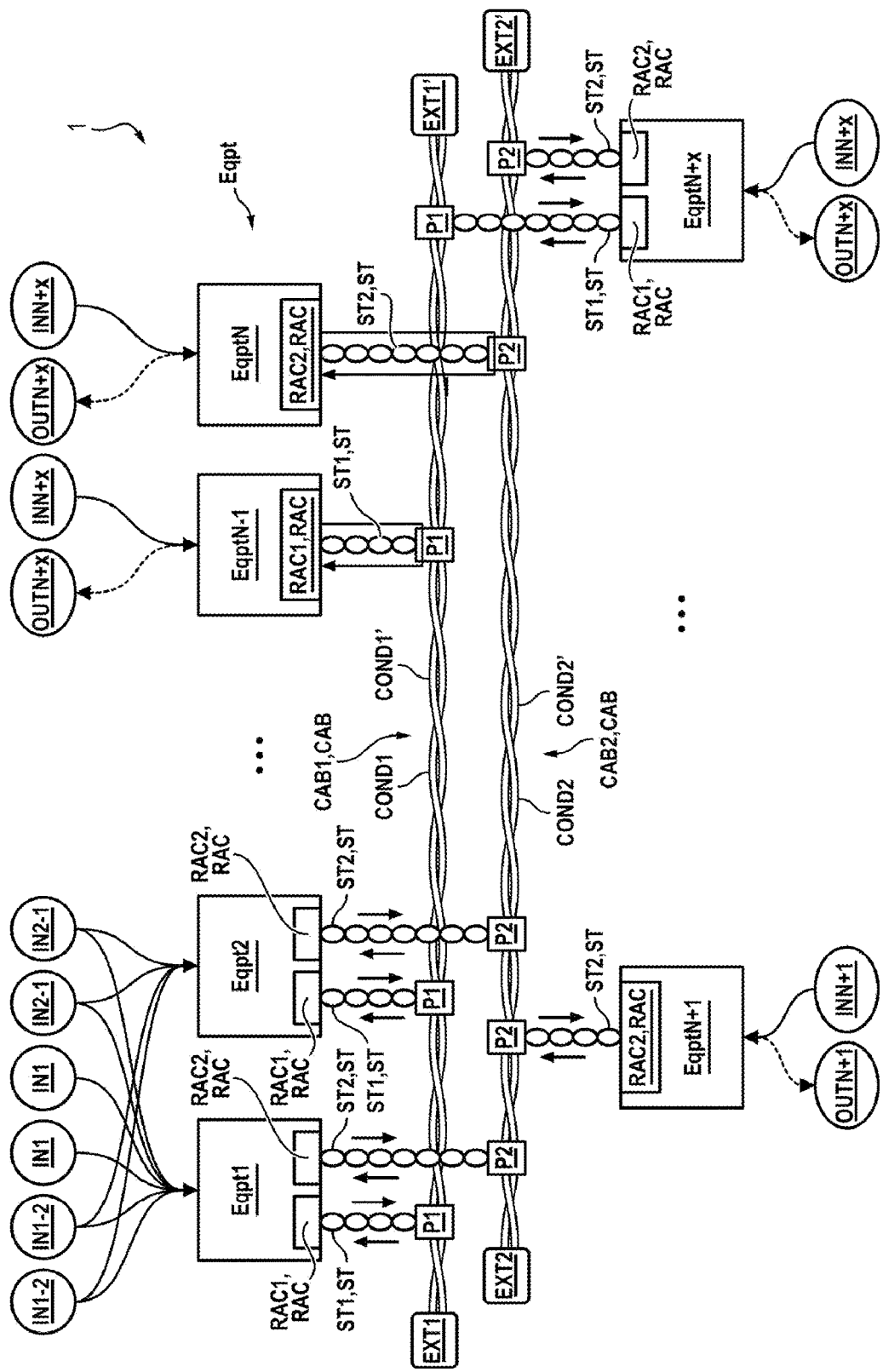

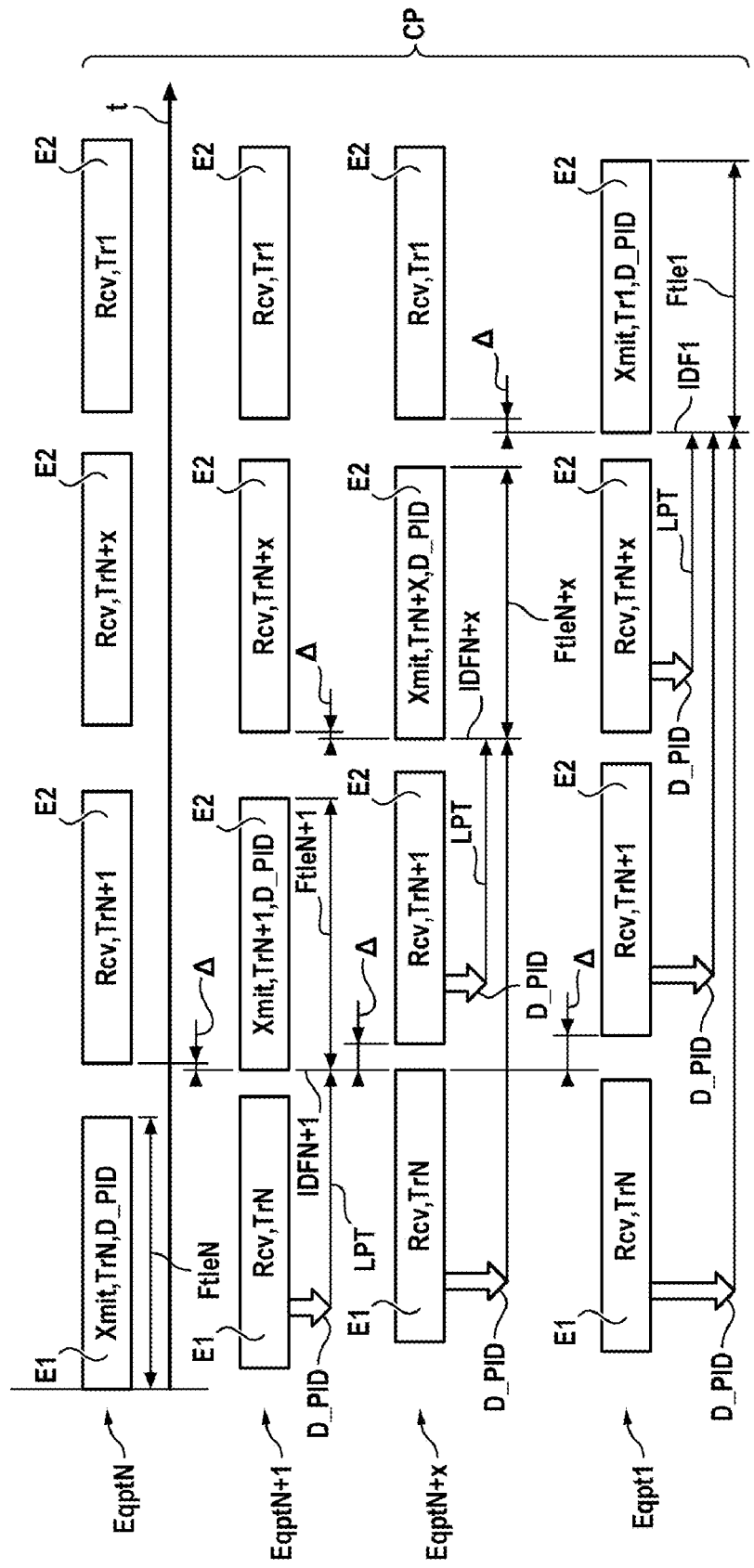

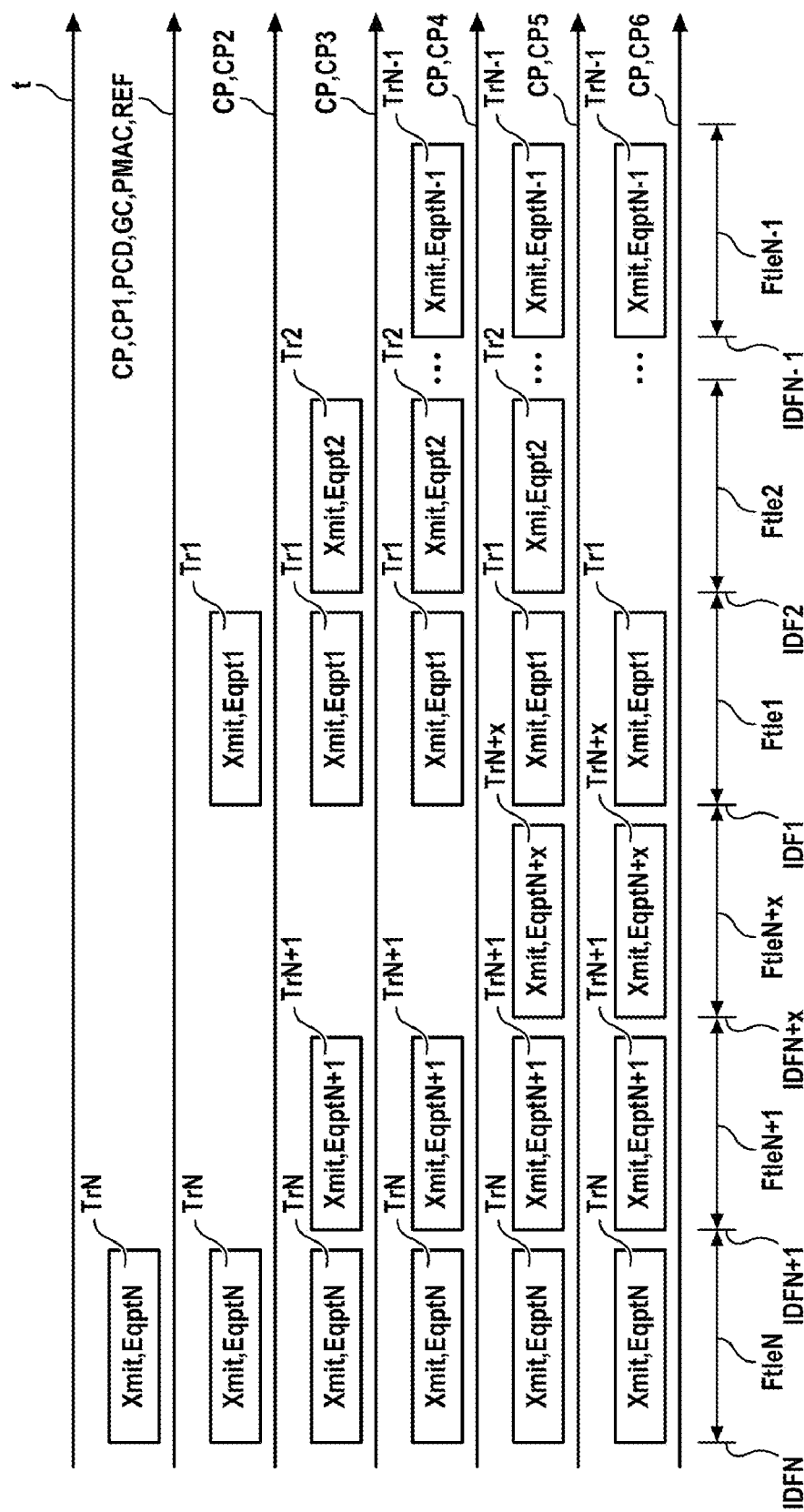

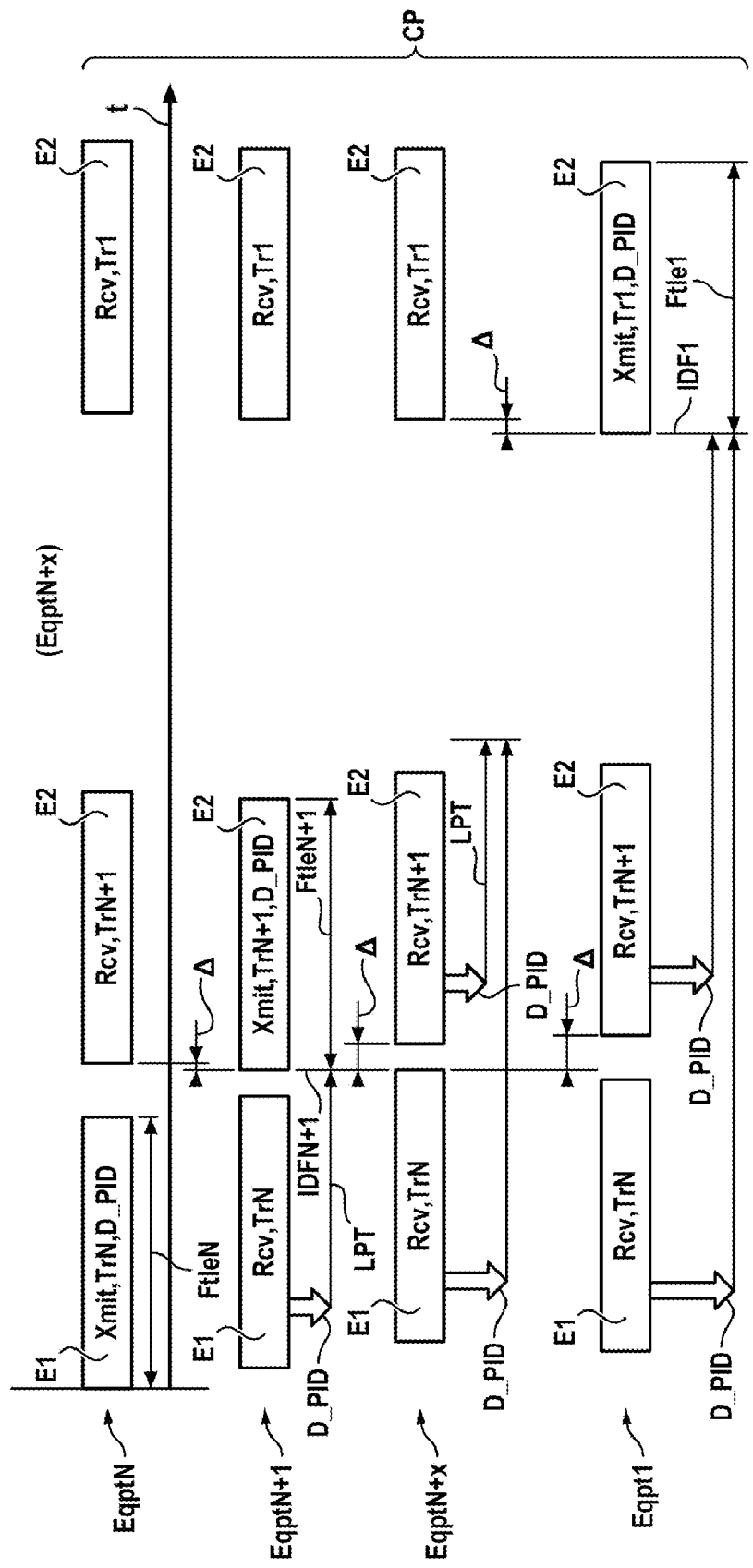

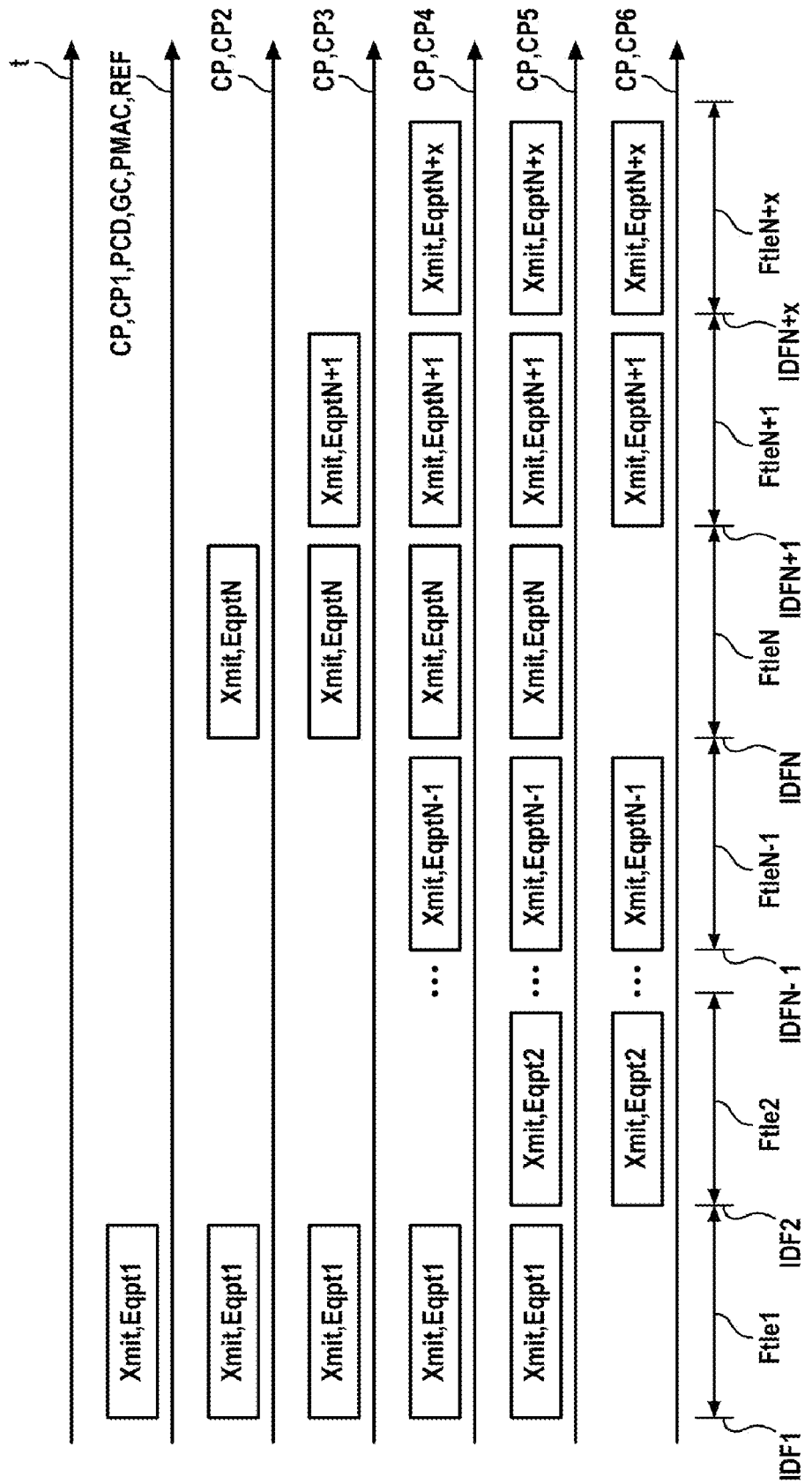

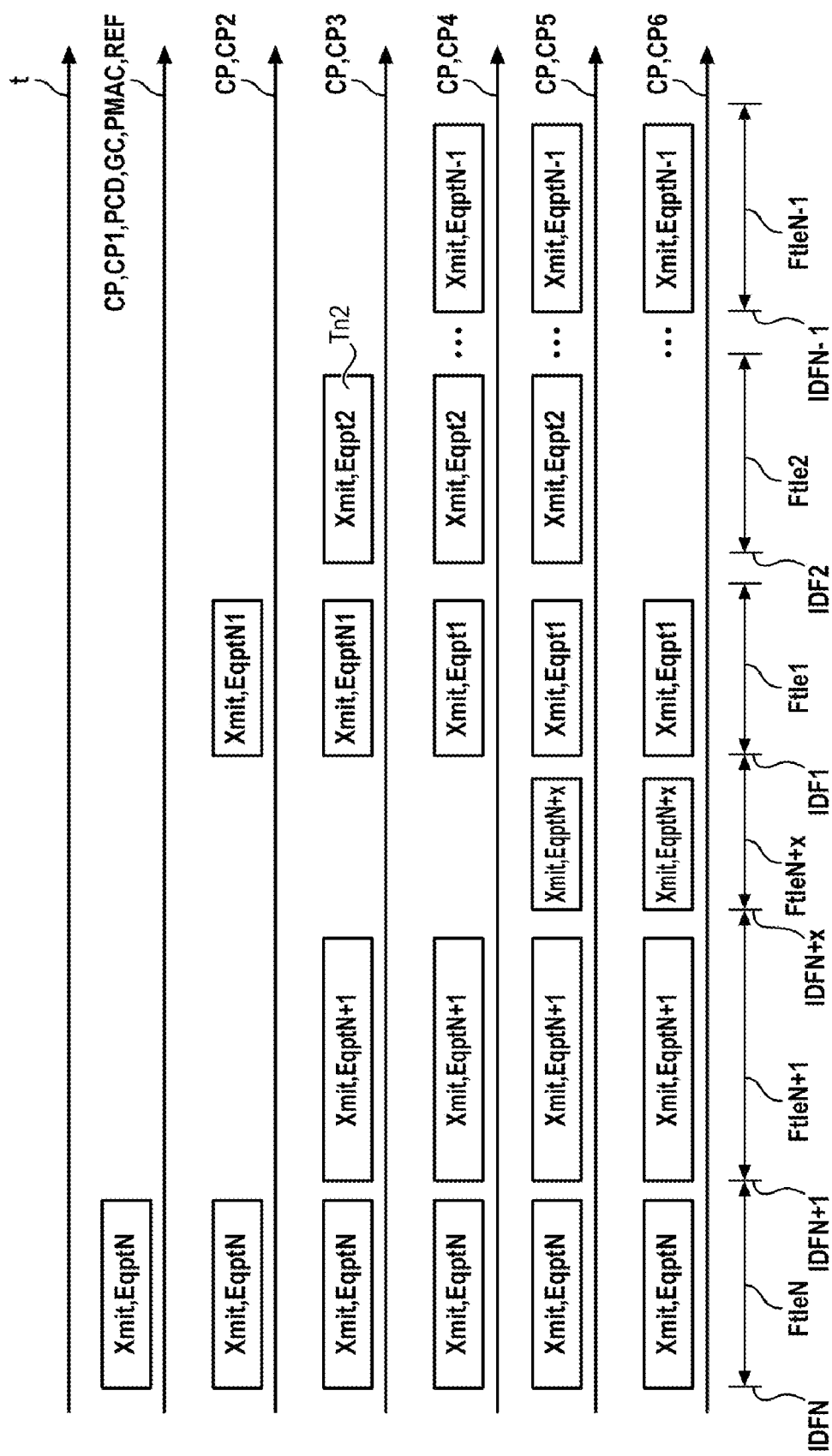

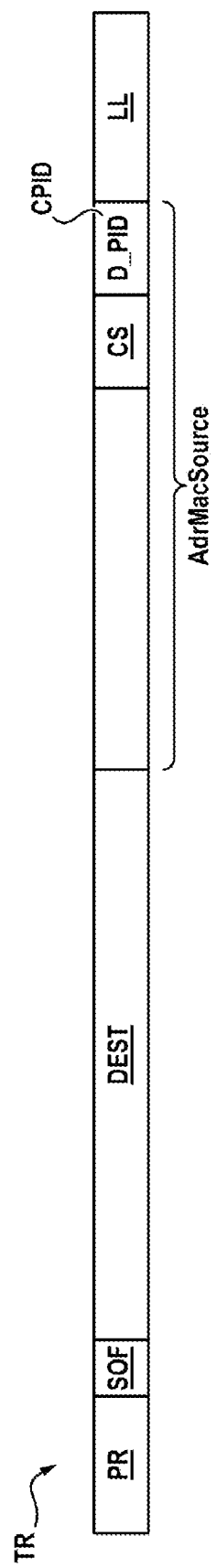
[Fig. 9]

[Fig. 10]

| L_PID \ D_PID | 1 | 2 | 3 | ...y | ...31 | 32 |
|---|---|---|---|---|---|---|
| 1 | 0 | LPT [1,2] | LPT [1,3] | | LPT [1,31] | LPT [1,32] |
| 2 | LPT [2,1] | 0 | LPT [2,3] | | | LPT [2,32] |
| 3 | LPT [3,1] | | 0 | | | LPT [3,32] |
| x | | | | 0 | | |
| 31 | LPT [31,1] | | | | 0 | LPT [31,32] |
| 32 | LPT [32,1] | | | | LPT [32,31] | 0 |

TGP, TSN, LPT

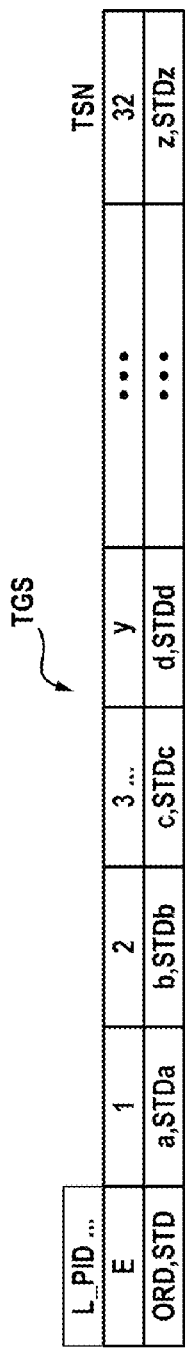
[Fig. 11]

[Fig. 12]
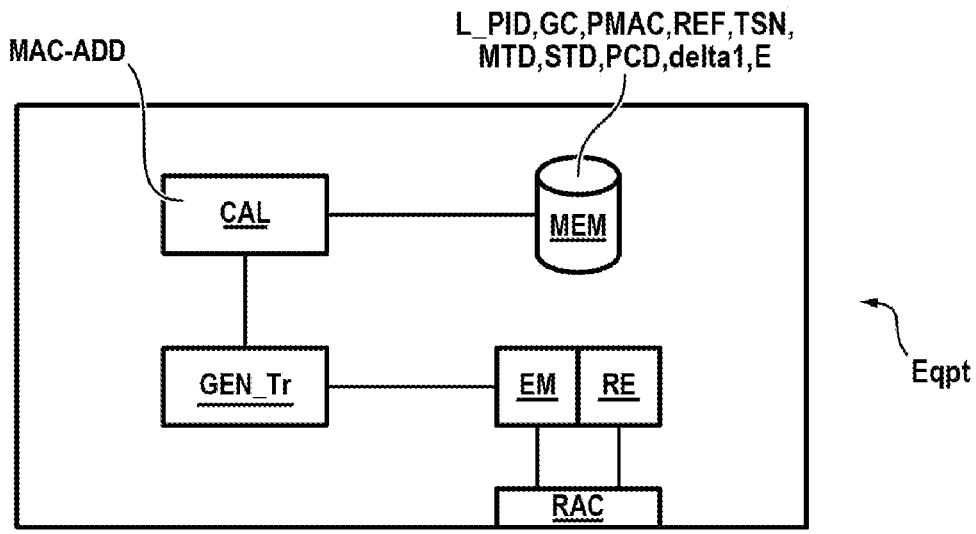
[Fig. 13]
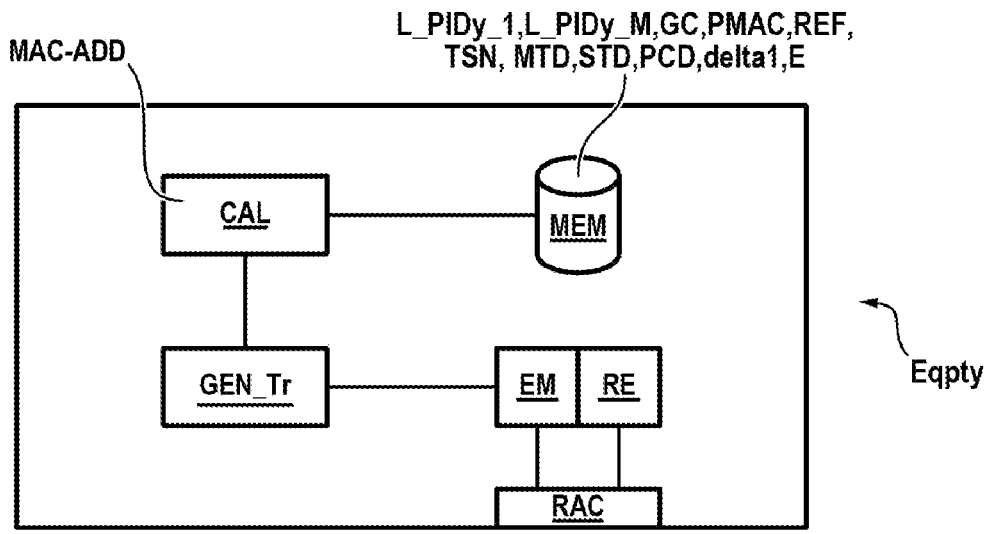

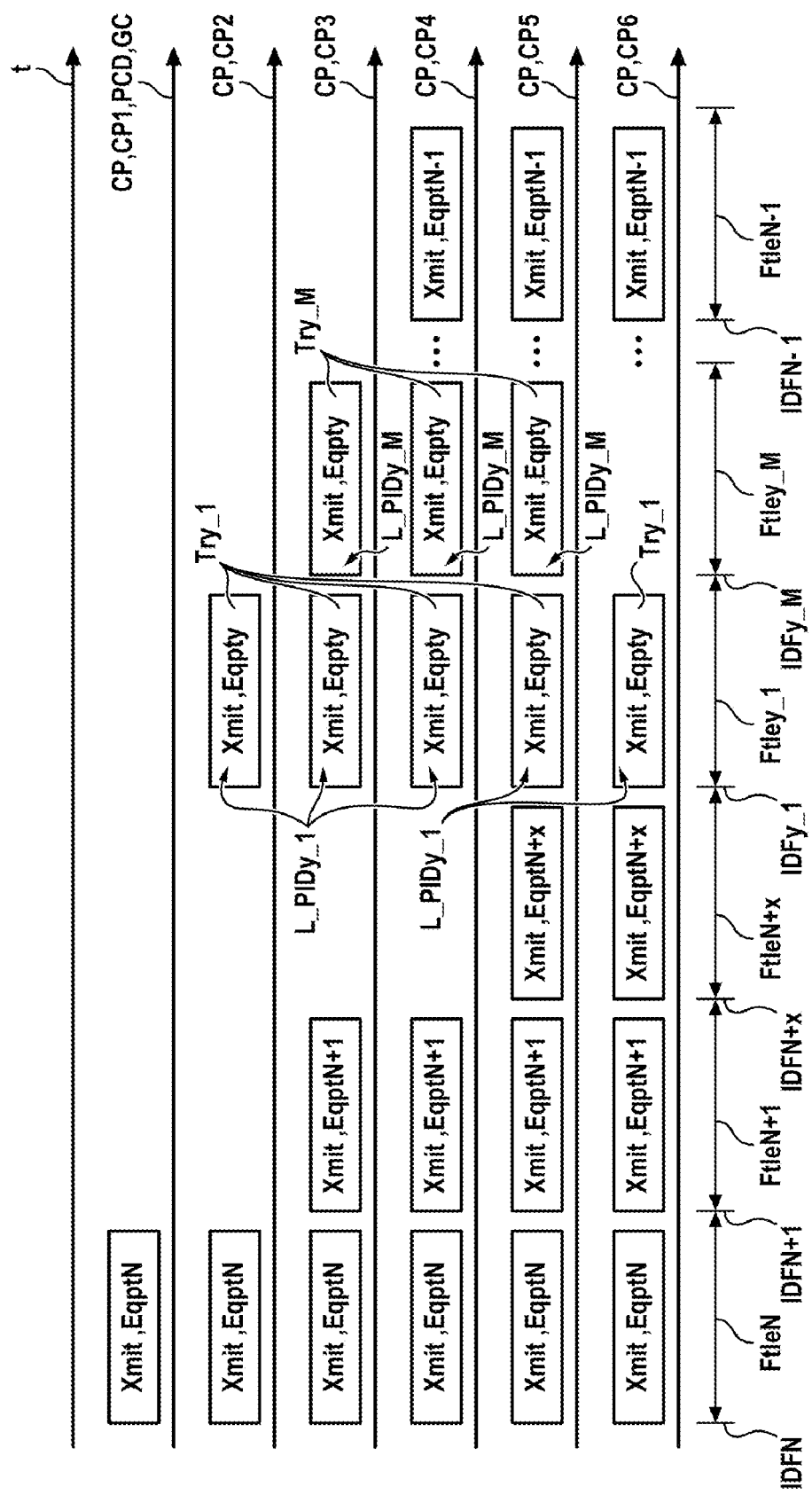
[Fig. 14]

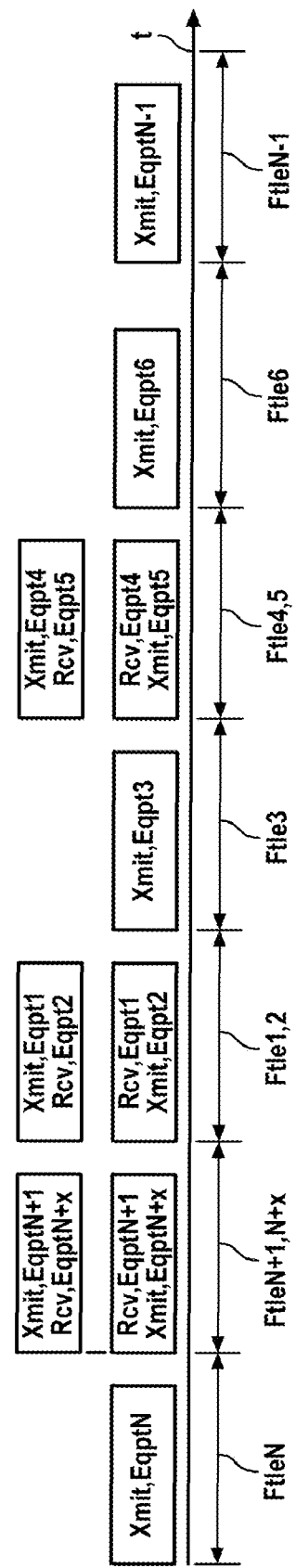

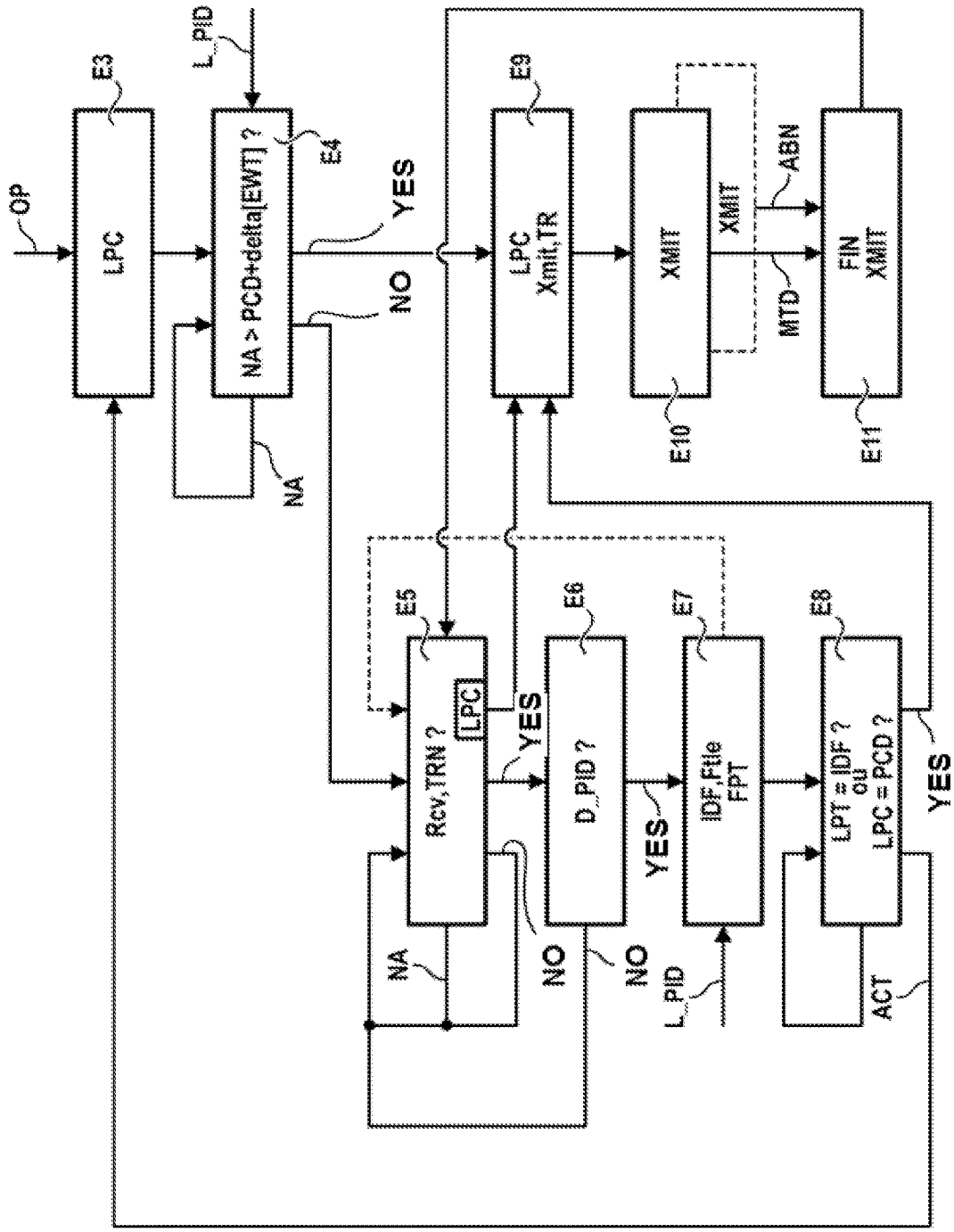
[Fig. 16]

METHOD, EQUIPMENT, COMMUNICATION PROGRAM, ON-BOARD DEVICE HAVING THESE EQUIPMENTS

The invention relates to a method for communicating data between communication equipments, a communication equipment, a computer program and an on-board device comprising these communication equipments.

The field of the invention is that of on-board communications, on on-board systems, using a multi-drop line with which the communication equipments are connected.

Such on-board systems are known comprising a bus called "field" bus to which the on-board communication equipments are connected, for example on an aircraft or the like.

Intra-system data exchanges, i.e. between the equipments, are highly time-constrained. Current implementations, known from the fieldbuses in avionics: CAN or Arinc 825, Arinc 429, Arinc 629, even 1553B; or even some specific/proprietary versions of Arinc 664P7 offer multi-drop capabilities (multi-equipments on the same physical medium) but present implementation constraints/limits, in particular the following ones:

Arinc 429, rate at 12.5 kbps-100 kbps: single-transmitter; reduced frame format,
Arinc 629, rate at 2 Mbps or 8 Mbps: specific physical layer,
CAN, rate at 1 Mbps: collision; system configuration.

The currently on-board fieldbuses have constraints or limitations and are generally based on technologies that are not directly compatible with the next-generation communication equipments, that is to say with the communication systems of the core networks, also called backbone networks, for inter-system exchanges. These next-generation communication equipments are now based on the Ethernet standard (IEEE802.3) with Std Arinc 664/Arinc 664P7 aeronautical adaptations to meet the determinism and availability of data exchanges.

The core networks are in a medium-high rate class (100 Mbps-1 Gbps, 10 Gbps, etc.) per physical link and generally implement intermediate network equipments (switch or IS function, the term IS meaning "intermediate system").

The fieldbuses are in a low-medium rate class (10 kbps-1 Mbps) with generally a direct sharing of a physical link (main cable) between the equipments, therefore generally without intermediate network equipments (no IS function).

One goal of the invention is to obtain a method for communicating data between communication equipments, a communication equipment, a computer program and an on-board device comprising these communication equipments, which overcome the drawbacks mentioned above and which improve them in terms of simplification, robustness while guaranteeing the determinism of the exchanges and relying on the absence of dedicated equipments organizing the exchanges, each communication equipment having to be autonomous when deciding to emit in order to allow maximum use of the physical rate, as well as better availability of the data exchange system.

To this end, a first subject matter object of the invention is a method for communicating data between a plurality of communication equipments present on an on-board device, the communication equipments being connected to at least one pair of communication conductors, characterized in that:

each communication equipment, when activated, is by default in a receiving mode, in which it is able to receive at least one data frame on the pair of communication conductors and is able to be put in an emission mode, in which it emits a data frame on the pair of communication conductors, each communication equipment has at least one incremental identification, which is a determined real value, the incremental identifications being different from each other, at least one of the communication equipments, called first communication equipment, is activated and put into the emission mode, during which the first communication equipment emits on the pair of communication conductors the data frame containing the incremental identification of the first communication equipment, called first data frame, while each second communication equipment, other than the first communication equipment, called second communication equipment, is activated and put into receiving mode, then the first communication equipment is put into receiving mode, each second communication equipment prescribes its local emission time window, which is associated with its incremental identification, during which the second communication equipment is put into emission mode for its data frame, a time of beginning of the local emission time window of each second communication equipment being a determined function, increasing with respect to a difference equal to the incremental identification of the second communication equipment from which is subtracted the incremental identification of the first communication equipment, contained in the first data frame, the local emission time windows being disjoint, each second communication equipment is put, for its incremental identification, into emission mode during which the second communication equipment emits on the pair of communication conductors its data frame, containing the incremental identification of the second communication equipment, during its local emission time window starting at the time of beginning of this local emission time window.

According to an embodiment of the invention, the determined function giving the time of beginning of the local emission time window of each second communication equipment is a linear or affine function, increasing with respect to the difference contained in the first data frame.

According to an embodiment of the invention, the determined function giving the time of beginning of the local emission time window of each second communication equipment is a linear or affine function, increasing piecewise with respect to the difference contained in the first data frame.

According to an embodiment of the invention, the local emission time windows of the second communication equipments each have the same duration from their time of beginning.

According to an embodiment of the invention, a time interval, identical for the second communication equipments, is prescribed between the data frames following each other.

According to an embodiment of the invention, the difference E is equal to:

$$E = L\_PID - D\_PID,$$

where L_PID is the incremental identification of the second communication equipment,
D_PID is the incremental identification of the first communication equipment, contained in the first data frame,
the incremental identifications L_PID and D_PID are positive integers following each other, in case the difference E is positive, the determined function IDF giving the time of beginning of the local emission time window of each second communication equipment is equal to:

$$IDF = E \cdot (STD+GT) - PMAC + REF,$$

where STD is a prescribed duration of the local emission time window of the second communication equipment from its time of beginning and is identical for the local emission time windows of the second communication equipments, GT is a prescribed time interval between the data frames following each other and is identical for the second communication equipments, PMAC is a prescribed duration, equal to part of the duration of a header of the data frame of the second communication equipment, REF is a reference time, equal to the time of beginning of the emission mode of the first communication equipment, and in case the difference E is negative, the determined function IDF giving the time of beginning of the local emission time window of each second communication equipment is equal to:

$$IDF = (TSN+E) \cdot (STD+GT) - PMAC + REF,$$

where TSN is the total number of communication equipments.

According to an embodiment of the invention, the determined function giving the time of beginning of the local emission time window of each second communication equipment comprises a table, which is recorded in each second communication equipment and which gives the time of beginning of the local emission time window of each second communication equipment according to the incremental identification of the second communication equipment and according to the incremental identification of the first communication equipment, contained in the first data frame.

According to an embodiment of the invention, a time interval, identical for the second communication equipments, is prescribed between the data frames following each other.

According to an embodiment of the invention, the local emission time windows of the second communication equipments each have the same duration from their time of beginning.

According to an embodiment of the invention, the determined function giving the time of beginning of the local emission time window of each second communication equipment comprises a sequencing table, which is recorded in each second communication equipment, which gives a sequencing order of the local emission time windows of the second communication equipments according to the difference equal to the incremental identification of the second communication equipment from which is subtracted the incremental identification of the first communication equipment, contained in the first data trame, and which gives the duration of each local emission time window depending on the incremental identification of each second communication equipment, the time of beginning of the local emission time window being determined by each second communication equipment at least from the durations of the local emission time windows and from the sequencing order.

According to an embodiment of the invention, at least one of the second communication equipments, called third communication equipment, has several respective incremental identifications, which are determined real values different from each other, each third communication equipment prescribes several respective local emission time windows, which are respectively associated with its respective incremental identifications and during which the third communication equipment is put into emission mode of respectively several data frames, a time of beginning of each respective local emission time window of the third communication equipment being a determined function, increasing with respect to a difference equal to the respective incremental identification of the third communication equipment from which is subtracted the incremental identification of the first communication equipment, contained in the first data frame, the respective local emission time windows being disjoint, each third communication equipment is put, for each of its respective incremental identifications, into emission mode during which the third communication equipment emits its data frame, containing the respective incremental identification of the third communication equipment, during its respective local emission time window starting at the time of beginning of this respective local emission time window.

According to an embodiment of the invention, a pre-established pair of two of the communication equipments operates in duplex during their local emission time windows which are simultaneous.

According to an embodiment of the invention, a first pre-established pair of two of the communication equipments operates in duplex during their first local emission time windows, which are simultaneous, and at least a second pre-established pair of two of the communication equipments operates in duplex during their second local emission time windows, which are simultaneous, the second local emission time windows being disjoint with respect to the first local emission time windows.

A second subject matter of the invention is a communication, intended to be present on an on-board device, the communication equipment being intended to be connected to at least one pair of communication conductors, characterized in that the communication equipment is able to be activated and comprises at least one transmitter, at least one receiver, a generator and a memory, when the communication equipment is activated and when the at least one transmitter is not in an emission mode, the at least one receiver is in a receiving mode, in which the at least one receiver is able to receive at least a first data frame that has been emitted by at least one other communication equipment on the at least one pair of communication conductors and containing at least a first incremental identification of the other communication equipment, the communication equipment has at least a second incremental identification, which is recorded in the memory of the communication equipment, the first incremental identification and the second incremental identification being determined real values different from each other, when the communication equipment is activated, the transmitter is able to be put into emission mode, in which the at least one transmitter emits on the at least one pair of communication conductors during a local emission time window of the communication equipment a second data frame generated by the generator and containing the second incremental identification, the communication equipment comprising a computer configured to prescribe the local emission time window, which is associated with its second incremental identification, the computer being configured to prescribe a time of beginning of the local emission time window of the communication equipment as being a determined function, increasing with respect to a difference equal to the second incremental identification of the communication equipment from which is subtracted the first incremental identification, contained in the first data frame.

A third subject matter of the invention is a computer program, comprising code instructions for the implementation of the following steps, when executed on a computer of a communication equipment, intended to be present on an on-board device, activating the communication equipment comprising at least one transmitter, at least one receiver, a generator and a memory, when the communication equipment is activated and when the transmitter is not in the emission mode, putting the at least one receiver in a receiving mode, in which the at least one receiver is able to receive at least a first data frame that has been emitted by at least one other communication equipment on a pair of communication conductors and containing at least a first incremental identification of the other communication equipment, the communication equipment having at least one second incremental identification, which is recorded in the memory of the communication equipment, the first incremental identification and the second incremental identification being determined real values different from each other, when the communication equipment is activated, putting the at least one transmitter into emission mode, in which the at least one transmitter emits on the pair of communication conductors during a local emission time window of the communication equipment a second data frame generated by the generator and containing the second incremental identification, prescribing the local emission time window, which is associated with the second incremental identification, prescribing a time of beginning of the local emission time window of the communication equipment as being a determined function, increasing with respect to a difference equal to the second incremental identification of the communication equipment from which is subtracted the first incremental identification, contained in the first data frame.

A fourth subject matter of the invention is an on-board communication device, comprising at least one pair of communication conductors and a plurality of communication equipments as described above, which are connected respectively in a plurality of positions along the at least one pair of communication conductors, the positions being different from each other along the at least one pair of communication conductors.

The invention will be better understood upon reading the following description, given solely by way of non-limiting example with reference to the figures below of the appended drawings.

FIG. 1 represents a schematic view of a communication device according to one embodiment of the invention.

FIG. 2 represents a schematic view of a communication device according to another embodiment of the invention.

FIG. 3 represents a schematic view of a communication device according to another embodiment of the invention.

FIG. 4 schematically represents one example of a timing diagram of the progress of the communication method according to one embodiment of the invention.

FIG. 5 schematically represents one example of a timing diagram of the progress of the communication method according to one embodiment of the invention.

FIG. 6 schematically represents another example of a timing diagram of the progress of the communication method according to one embodiment of the invention.

FIG. 7 schematically represents another example of a timing diagram of the progress of the communication method according to one embodiment of the invention.

FIG. 8 schematically represents another example of a timing diagram of the progress of the communication method according to one embodiment of the invention.

FIG. 9 schematically represents the format of a data frame header, which can be used according to the invention.

FIG. 10 schematically represents one example of an emission time position table that can be used according to the invention.

FIG. 11 schematically represents another example of a table that can be used according to the invention.

FIG. 12 schematically represents a communication equipment according to one embodiment of the invention.

FIG. 13 schematically represents a communication equipment according to another embodiment of the invention.

FIG. 14 schematically represents another example of a timing diagram of the progress of the communication method according to one embodiment of the invention.

FIG. 15 schematically represents another example of a timing diagram of the progress of the communication method according to one embodiment of the invention.

FIG. 16 schematically represents one example of a flowchart for the implementation of the communication method according to one embodiment of the invention.

In FIGS. 1 to 16, a data communication method is provided between several, for example a number N+x, of communication equipments Eqpt1, Eqpt2, . . . , EqptN−1, EqptN, EqptN+1, . . . , EqptN+x, which are connected to one (or several) pair(s) CAB of communication conductors COND, COND' and are generally designated by the reference sign Eqpt (and likewise the equipments Eqpt3, Eqpt4, Eqpt5, Eqpt6 of FIG. 15). N is a natural integer greater than or equal to 1. x is a natural integer greater than or equal to 1. The communication conductors COND, COND' are insulated from each other. The communication conductors COND, COND' extend in length between an interface EXT attached to two first ends of the conductors COND, COND' and another interface EXT' attached to two second ends of the conductors COND, COND', these interfaces EXT, EXT' serving as physical interfaces that allow connecting the pair CAB to other parts of a circuit and which may comprise adapters (for example impedance adapters, or the like). The pair CAB of communication conductors COND, COND' is for example formed by a cable, for example in the form of a twisted pair of communication conductors COND, COND'. Each communication equipment Eqpt is connected to the pair CAB by a section ST of two conductors insulated from each other, the two first ends of which are respectively connected to the conductors COND, COND' at a determined position P along the pair CAB and two second ends of which are connected to two terminals forming part of an attachment unit RAC of the communication equipment Eqpt, the attachment positions P of the equipments Eqpt being remote from each other along the pair CAB. The communication is bidirectional on the conductors COND, COND', the interfaces EXT, EXT', the pair CAB, the sections ST, the positions P and the attachment units RAC. The communication equipments Eqpt1, Eqpt2, . . . , EqptN−1, EqptN, EqptN+1, . . . , EqptN+x, the pair(s) CAB, the sections ST and the pairs EXT1, EXT2 form part of an on-board communication device 1, implementing the communication method. The on-board device can be an avionics device, like for example a turbomachine, such as for example a turbojet engine of an aircraft, or on an aircraft: a braking system or a system for managing equipments, or the like.

In the embodiment of FIG. 1, each communication equipment Eqpt comprises a single attachment unit RAC, connected by a single section ST at an attachment position P to the pair CAB. In the embodiment of FIG. 1, the communication device 1 is single-pair.

In the embodiment of FIG. 2, two distinct pairs CAB, namely the pair CAB1 of communication conductors COND1, COND1' insulated from each other and the pair CAB2 of communication conductors COND2, COND2' insulated from each other and insulated from the conductors COND1, COND1' are provided, the communication equipments Eqpt being connected to the pair CAB1 and to the pair CAB2 (two mono-pairs CAB1 and CAB2). The communication conductors COND1, COND1' extend in length between an interface EXT1 attached to two first ends of the conductors COND1, COND1' and another interface EXT1' attached to two second ends of the conductors COND1, COND1', wherein these interfaces EXT1, EXT1' serve as physical interfaces that allow connecting the pair CAB1 to other parts of a circuit and may comprise adapters (for example impedance adapters, or the like). The communication conductors COND2, COND2' extend in length between an interface EXT2 attached to two first ends of the conductors COND2, COND2' and another interface EXT2' attached to two second ends of the conductors COND2, COND2', wherein these interfaces EXT2, EXT2' serve as physical interfaces that allow connecting the pair CAB2 to other parts of a circuit and may comprise adapters (for example impedance adapters, or the like). Each communication equipment Eqpt is connected to the pair CAB1 by a section ST1 of two conductors insulated from each other, two first ends of which are respectively connected to the conductors COND1, COND1' at a determined position P1 along the pair CAB1 and two second ends of which are connected to two terminals forming part of an attachment unit RAC1 of the communication equipment Eqpt, the attachment positions P1 of the equipments Eqpt being remote from each other along the pair CAB1. Each communication equipment Eqpt is connected to the pair CAB2 by another section ST2 of two conductors insulated from each other, the two first ends of which are respectively connected to the conductors COND2, COND2' at a determined position P2 along the pair CAB2 and two second ends of which are connected to two terminals forming part of another attachment unit RAC2 of the communication equipment Eqpt, the attachment positions P2 of the equipments Eqpt being remote (different) from each other along the pair CAB2. The communication is bidirectional on the conductors COND1, COND1', COND2, COND2', the interfaces EXT1, EXT1', EXT2, EXT2', the pairs CAB1, CAB2, the sections ST1, ST2, the positions P1, P2 and the attachment units RAC1, RAC2. The pairs CAB1 and CAB2 thus provide a connection redundancy to the equipments Eqpt. The management of the redundancy can be managed by additional control units of the attachment units RAC1 and RAC2.

FIG. 3 represents one variant of FIG. 2, where some of the equipments Eqpt, such as for example the equipments Eqpt1, Eqpt2 and EqptN+x, are of the type with two units RAC1 and RAC2 for attachment to the pairs CAB1 and CAB2 according to FIG. 2 and where other equipments Eqpt such as for example the equipments EqptN−1, EqptN and EqptN+1 are of the type with a single unit RAC1 or RAC2 for attachment to the pair CAB1 or CAB2 according to FIG. 1.

As illustrated in FIGS. 12 and 13, each of the communication equipments Eqpt, Eqpt1, . . . , –EqptN+x comprises at least one transmitter EM, at least one receiver RE, a non-volatile memory MEM, a computer CAL and a generator GEN_Tr of data frames. The computer CAL can be or comprise one or several machine(s), one or several processor (s), one or several microprocessor(s), one or several random access memory/memories, one or several non-volatile memory/memories. The computer CAL can comprise one or several physical data input interface(s), one or several physical data output interface(s). This/these physical data input interface(s) can be or comprise one or several physical data communication port(s) or the like. This/these physical data output interface(s) can be or comprise one or several physical data communication port(s) or the like. A computer program can be recorded and executed on the computer CAL and can comprise code instructions which, when executed thereon, implement all or part of the communication method. Each transmitter EM can be attached to the attachment unit RAC or RAC1 or RAC2 in the emission mode Xmit. Each receiver RE can be attached to the attachment unit RAC or RAC1 or RAC2 in the receiving mode Rcv. Each of the equipments Eqpt, Eqpt1, . . . , –EqptN+x, when activated and when its transmitter EM is not in the emission mode Xmit, is by default in a receiving mode Rcv, in which it is able to receive by its receiver RE at least one data frame that has been sent on the pair CAB by another of the communication equipments Eqpt1, . . . , –EqptN+x. Each of the equipments Eqpt, Eqpt1, . . . , –EqptN+x, when activated, can be put into the emission mode Xmit, in which its transmitter EM emits on the pair CAB a data frame that has been generated by its data frame generator GEN_Tr. The transmitter EM and the receiver RE of each communication equipment Eqpt can form part of a transceiver. This corresponds to the fact that, according to one embodiment, each equipment Eqpt, Eqpt1, . . . , –EqptN+x, operates in half-duplex. When the respective equipment Eqpt1, . . . , –EqptN+x is deactivated, it is off and is neither in the emission mode Xmit, nor in the receiving mode Rcv.

The data frame generator GEN_Tr can be connected to the transmitter EM and can be any device sending useful data, which can contain for example measurements from a sensor of the on-board device, associated with the equipment Eqpt, operating data of a part of the on-board device, associated with the equipment Eqpt, data from another avionics computer or the like, as represented by the devices IN1-2, IN1, IN2-1, INN+x, INN+1 in FIGS. 1 to 3. Similarly, the equipment Eqpt can comprise any device to collect data, which can be connected to the receiver RE receiving data, such as for example another avionics computer or the like, as represented by the devices OUTN+x, OUTN+1 in FIGS. 1 to 3.

Each of the communication equipments Eqpt1, . . . , –EqptN+x has one (or several, as described below) incremental identification(s) L_PID, which is a determined real value and which is local to this equipment and which is recorded in the respective memory MEM of the communication equipment Eqpt1-EqptN+x. The incremental identifications L_PID of the communication equipments Eqpt1, . . . , –EqptN+x or of the same equipment Eqpt are different from each other.

In one embodiment, the incremental identifications L_PID can have a link with the positions P of the equipments Eqpt1, Eqpt2, . . . , EqptN−1, EqptN, EqptN+1, . . . , EqptN+x and with the order of these positions P along the pair CAB. In one optional embodiment, each equipment EqpT can establish its incremental identification L_PID from its unique physical position P. For example, and without limitation, each incremental identification L_PID of the equipment Eqpt1, . . . , EqptN+x is an real value determined and increasing according to one position of this equipment Eqpt1, . . . , EqptN+x according to a determined orientation along the pair CAB.

In another embodiment, the incremental identifications L_PID may have no link with the positions P of the equipments Eqpt1, Eqpt2, . . . , EqptN−1, EqptN, EqptN+1, . . . , EqptN+x and with the order of these positions P along the pair CAB. The incremental identifications L_PID (the L meaning local) can be consecutive positive integers, for example 1, 2, . . . , N−1, N, N+1, . . . , N+x respectively for the communication equipments Eqpt1, Eqpt2, . . . , EqptN−1, EqptN, EqptN+1, . . . , EqptN+x, in the embodiments described below.

A main cycle CP is described below comprising step E1 and several steps E2 in FIGS. 4 and 6. During the first step E1, one of the communication equipments, called first communication equipment, which is for example the communication equipment EqptN in FIGS. 4 and 5, 6, 8, 14 and 15 is activated and put into the emission mode Xmit, during which the transmitter EM of this first communication equipment EqptN emits on the pair CAB during the local emission time window FtleN the data frame TrN, containing the first incremental identification L_PID (this incremental identification L_PID being subsequently called first incremental identification D_PID when this incremental identification L_PID is present in an emitted or received data frame, the D meaning remote) of this first communication equipment EqptN, called first data frame TrN (as indicated by the symbols Xmit, TrN), while each of the other activated communication equipments Eqpt1, . . . , EqptN−1, EqptN+1, . . . , EqptN+x, called second communication equipment, is put into receiving mode Rcv and receives the data frame TrN (as indicated by the symbols Rcv, TrN) emitted on the pair CAB. FIGS. 4 to 8, 14 and 15 show, as a function of time t elapsing from left to right on the horizontal axis, one example of the emission modes Xmit and of the receiving modes Rcv of the first communication equipment EqptN and of the second activated equipments EqptN+1, EqptN+x and Eqpt1. Each communication equipment Eqpt in the receiving mode Rcv receives the data frame emitted by another communication equipment Eqpt on the pair CAB with a propagation delay A with respect to the time of beginning of the emission of this frame, this propagation delay A increasing with the distance between these equipments. Thus, each communication equipment Eqpt in the receiving mode Rcv is continuously listening for the presence of activity on the pair CAB in half-duplex mode.

During the second successive steps E2 subsequent to the first step E1, the first communication equipment EqptN is put in receiving mode Rcv.

During the second successive steps E2, the computer CAL of each second communication equipment Eqpt1, . . . , EqptN−1, EqptN+1, . . . , EqptN+x, respectively prescribes its local emission time window Ftle1, . . . , FtleN−1, FtleN+1, . . . , FtleN+x, which is associated with the respective incremental identification L_PID of this second communication equipment Eqpt1, . . . , EqptN−1, EqptN+1, . . . , EqptN+x (called second incremental identification L_PID) and during which this second communication equipment Eqpt1, . . . , EqptN−1, EqptN+1, . . . , EqptN+x is put into emission mode Xmit for its respective data frame Tr1, . . . , TrN−1, TrN+1, . . . , TrN+x (called second data frame), generated by the generator GEN_Tr thereof. The computer CAL of each second communication equipment Eqpt1, . . . , EqptN−1, EqptN+1, . . . , EqptN+x prescribes respectively the respective time of beginning IDF1, . . . , IDFN−1, IDFN+1, . . . , IDFN+x of emission of its respective local emission time window Ftle1, . . . , FtleN−1, FtleN+1, . . . , FtleN+x (or emission beginning time). This respective beginning time IDF1, . . . , IDFN−1, IDFN+1, . . . , IDFN+x is prescribed according to a determined function, increasing with respect to a difference E equal to the respective incremental identification L_PID of the second communication equipment Eqpt1, . . . , EqptN−1, EqptN+1, . . . , EqptN+x from which is subtracted the incremental identification D_PID of the first communication equipment EQptN, contained in the first data frame TrN, having been received by the second communication equipment Eqpt1, . . . , EqptN−1, EqptN+1, . . . , EqptN+x which is in the receiving mode Rcv. The respective local emission time windows Ftle1, . . . , FtleN−1, FtleN+1, . . . , FtleN+x are disjoint.

The determination of the emission beginning time IDF1, . . . , IDFN−1, IDFN+1, . . . , IDFN+x is made autonomously by each equipment Eqpt according to the algorithm described above. It is based on the continuous listening, in the receiving mode Rcv, of the presence (or not) of activity (frame) on the pair CAB and on the determination of the identity (incremental identification D_PID) of each equipment transmitting (for example EqptN in the example described above) making it possible to position this time of beginning of opening of the local emission window of the second equipment Eqpt.

According to one embodiment of the invention, the determination of the emission beginning time IDF1, . . . , IDFN−1, IDFN, IDFN+1, . . . , IDFN+x can be made respectively by the communication equipment Eqpt1, . . . , EqptN−1, EqptN+1, . . . , EqptN+x also with respect to one, several, all or the last of the other data frames received by this communication equipment Eqpt1, . . . , EqptN−1, EqptN+1, . . . , EqptN+x when activated in the receiving mode Rcv, while each equipment Eqpt in the emission mode Xmit of a first frame containing the incremental identification D_PID thereof can play the role of first equipment.

The incremental identification D_PID can comprise in FIG. 9 an encoding specific to the equipment transmitting in the emitted data frame. There may be a retranscription of the incremental identification D_PID in a source address field AdrS (which may for example be the field AdrMacSource according to the IEEE802.3 standard and which may be 6 bytes) with the encoding field CS for integrity guarantee upon receipt and a decoding. The data frame can comprise, for example, the incremental identification D_PID encoded on a field CPID, which may be one byte for encoding of 32 positions P (for maximum TSN=32) and associated with the sum check field CS for the bits of the field CPID and for validation of the encoding of the incremental identification D_PID, this field CS possibly being of one byte for validation of the encoding of the incremental identification D_PID, the value 0 possibly being excluded for the incremental identification D_PID. In FIG. 9, the header of the data frame Tr can successively comprise the preamble PR, the field SOF, the destination address MAC field DEST (which may be for example of 6 bytes), the AdrMacSource field ending with the field CS and the field CPID, then the length LL field (which may be for example of 2 bytes).

Each equipment Eqpt listening in the frame receiving mode Rcv decodes each field AdrMacSource received to extract and determine, as represented by the arrows in FIGS. 4 and 6 and in step E6 of FIG. 16, the incremental identification D_PID of the remote equipment transmitting each received frame and deduce therefrom its own emission beginning time associated with its own incremental identification L_PID according to the pre-established emission law (for example: succession of the emissions in the incremental order of the values of the incremental identifications L_PID, modulo TSN). In case of detection of an inconsistency in the incremental identification D_PID of a frame received by a equipment Eqpt, the associated frame is not taken into account as a reference for the elaboration of the time of beginning of the emission of this equipment; the former reference is kept. The equipment Eqpt then restarts waiting for the correct detection of a next frame (step E5 of detecting an activity or waiting for the counter LPC of the equipment Eqpt to elapse in FIG. 16).

In the non-limiting example of FIG. 9, the consideration of a data frame received by the equipment Eqpt as a new time reference for this equipment Eqpt is established based on: receipt-analysis: receipt of the AdrMacSource of the frame and extraction of the 16 least significant bits with the incremental identification D_PID on the field CPID of 1 least significant byte and the sum check field CS for the bits of the field CPID of 1 byte (second more significant byte), monitoring of integrity between the check field CS and the incremental identification D_PID on the field CPID. If the integrity monitoring gives a positive result, a validity monitoring of the value of the incremental identification D_PID extracted from the field CPID is performed on: correct encoding D_PID (32 correct codes out of 256 possibilities), D_PID is not >TSN (1st version only), D_PID of the received frame is different from L_PID of the equipment Eqpt receiving this frame, D_PID different from 0.

During the second successive steps E2, each second respective communication equipment Eqpt1, . . . , EqptN−1, EqptN+1, . . . , EqptN+x is put into emission mode Xmit, during which the transmitter EM of this second communication equipment Eqpt1, . . . , EqptN−1, EqptN+1, . . . , EqptN+x emits on the pair CAB its respective data frame Tr1, . . . , TrN−1, TrN+1, . . . , TrN+x, containing the incremental identification D_PID of this second communication equipment Eqpt1, . . . , EqptN−1, EqptN+1, . . . , EqptN+x, during its respective local emission time window Ftle1, . . . , FtleN−1, FtleN+1, . . . , FtleN+x starting at the respective time of beginning IDF1, . . . , IDFN−1, IDFN+1, . . . , IDFN+x of this local emission time window Ftle1, . . . , FtleN−1, FtleN+1, . . . , FtleN+x. Thus, each equipment in the emission mode Xmit is identified in the data frame it emits. The decision for the equipment Eqpt to emit can be taken as a function of the position P (or the identification L_PID) of the equipment Eqpt and of the last observed emission(s) (receipt) by this equipment Eqpt: the emission window can be determined by each equipment Eqpt in relative position with respect to the previous or current correct reception (s).

The time series of the local emission time windows Ftle1, . . . , FtleN−1, FtleN, FtleN+1, . . . , FtleN+x is thus allocated in advance to all the communication equipments Eqpt1, . . . , EqptN−1, EqptN, EqptN+1, . . . , EqptN+x (for the first and second equipments, whether each of these equipments is activated in the emission mode Xmit or in the receiving mode Rcv or whether this equipment is deactivated) and forms the main cycle CP. Each equipment Eqpt thus has the same opportunity to emit on each main cycle CP. Thus, FIG. 6 shows, as a function of time t elapsing from left to right on the horizontal axis, another example of the emission modes Xmit and the receiving modes Rcv of the first communication equipment EqptN and of the second equipments EqptN+1 and Eqpt1 activated, with the equipment EqptN+x, which becomes deactivated at the time indicated by (EqptN+x) and is then reactivated. Each equipment Eqpt present and activated must systematically emit its data frame in the emission mode Xmit during its local emission time window. The non-emission of an equipment Eqpt during its local emission time window corresponds to the absence of this equipment Eqpt or to the deactivation of this present equipment Eqpt. On each emission of the data frame in the emission mode Xmit during the local emission time window, the data of the frame can be refreshed or not be refreshed. There is thus a predefined (configured) basis of parameters—known by all equipments Eqpt—for the determination of the emission beginning time. Each main cycle CP has a duration PCD. Each main cycle CP has a minimum non-emission duration GC per duration PCD.

FIG. 5 shows one example of several successive main cycles CP, where the receiving modes Rcv have not been shown although present and where the first communication equipment is the equipment EqptN, as indicated above.

During the main cycle CP1, only the first equipment EqptN is activated in the emission mode Xmit of its frame TrN according to step E1 during its window FtleN and the second communication equipments Eqpt1, . . . , EqptN−1, EqptN+1, . . . , EqptN+x are deactivated. Then, during the main cycle CP2, the first equipment EqptN is activated in the emission mode Xmit of its frame TrN according to step E1 during its window FtleN, the equipment Eqpt1 is activated in the emission mode Xmit of its frame Tr1 according to step E1 during its window Ftle1, and the second communication equipments Eqpt2, . . . , EqptN−1, EqptN+1, . . . , EqptN+x are deactivated.

Then, during the main cycle CP3, the first equipment EqptN is activated in the emission mode Xmit according to step E1 during its window FtleN, the equipment EqptN+1 is activated in the emission mode Xmit of its frame TrN+1 according to step E1 during its window FtleN+1, the equipment Eqpt1 is activated in the emission mode Xmit of its frame Tr1 according to step E1 during its window Ftle1, the equipment Eqpt2 is activated in the emission mode Xmit of its frame Tr2 according to step E1 during its window Ftle2, and the other second communication equipments EqptN−1, . . . , EqptN+x are deactivated.

Then, during the main cycle CP4, the first equipment EqptN is activated in the emission mode Xmit of its frame TrN according to step E1 during its window FtleN, the equipment EqptN+1 is activated in the emission mode Xmit of its frame TrN+1 according to step E1 during its window FtleN+1, the equipment Eqpt1 is activated in the emission mode Xmit of its frame Tr1 according to step E1 during its window Ftle1, the equipment Eqpt2 is activated in the emission mode Xmit of its frame Tr2 according to step E1 during its window Ftle2, the equipment EqptN−1 is activated in the emission mode Xmit of its frame TrN−1 according to step E1 during its window FtleN−1, and the second communication equipments EqptN+x are deactivated.

Then, during the main cycle CP5, the first equipment EqptN is activated in the emission mode Xmit of its frame TrN according to step E1 during its window FtleN, the equipment EqptN+1 is activated in the emission mode Xmit of its frame TrN+1 according to step E1 during its window FtleN+1, the equipment EqptN+x is activated in the emission mode Xmit of its frame TrN+x according to step E1 during its window FtleN+x, the equipment Eqpt1 is activated in the emission mode Xmit of its frame Tr1 according to step E1 during its window Ftle1, the equipment Eqpt2 is activated in the emission mode Xmit of its frame Tr2 according to step E1 during its window Ftle2 starting at the time of beginning IDF2, the equipment EqptN−1 is activated in the emission mode Xmit of its frame TrN−1 according to step E1 during its window FtleN−1.

Then, during the main cycle CP6, the first equipment EqptN is activated in the emission mode Xmit of its frame TrN according to step E1 during its window FtleN, the equipment EqptN+1 is activated in the emission mode Xmit of its frame TrN+1 according to step E1 during its window FtleN+1, the equipment EqptN+x is activated in the emission mode Xmit of its frame TrN+x according to step E1 during its window FtleN+x, the equipment Eqpt1 is activated in the emission mode Xmit of its frame Tr1 according to step E1 during its window Ftle1, the equipment EqptN−1 is activated in the emission mode Xmit of its frame TrN−1 according to step E1 during its window FtleN−1, and the second communication equipment Eqpt2 is deactivated.

Of course, the first communication equipment may be other than the equipment EqptN and may be for example the equipment Eqpt1 presented as an example in FIG. 7, which shows another example of several successive main cycles CP, where the receiving modes Rcv have not been shown although present.

Thus, on a pre-established basis, each equipment Eqpt has the knowledge, by individual configuration, of the necessary transverse parameters allowing it to open its own local emission window by being positioned temporally relative to the other emissions or allowing it to determine that this equipment is the only and first unique transmitter equipment during the considered phase. The emissions of each activated equipment Eqpt (in line on the same pair CAB) are systematic within its local emission window, whether the host message of the associated equipment has been refreshed or not, thus allowing the other activated equipments Eqpt to benefit from a positioning and identification indication time reference for each equipment in the emission mode Xmit. The emissions are established without collision by strict exclusion of the locally determined time windows maximizing the use of the physical rate with consideration of the clock drifts and physical propagation time deviations on the pair CAB. From the first emission after putting in line the equipment Eqpt, the emissions of this equipment Eqpt are stabilized based on the main cycle regardless of the emissions or not of the other equipments Eqpt.

Thus, each equipment Eqpt does not need a controller supporting a specific function of monitoring the bus CAB or of beacon generator. The equipments Eqpt operate with these deactivated functions. The communication device is thus more available and less subject to drift. The equipments Eqpt thus have equivalent operations with regard to the emission and to the reception.

The computer program of each equipment implementing the communication method can be present in an additional module MAC-ADD of the computer CAL, which can be installed between an access control module for the pair CAB (module MAC meaning Medium Access Control) and a physical module (physical layer) such as the module RAC, or can be directly integrated into the access control module for the pair CAB.

According to one embodiment of the invention, represented in FIG. 16, the equipment Eqpt implements its own communication method described below.

During step E3, a main cycle counter LPC on this equipment Eqpt is loaded and started. The step E3 can be triggered by the activation OP of the equipment Eqpt.

Then in step E4, for its incremental identification L_PID, the equipment Eqpt waits in the receiving mode Rcv and examines whether it has received any first data frame (for example the first frame TRN as in the example of FIG. 4 described above) of its receiver RE and whether the duration NA during which it has not received any data frame TRN from its receiver RE is greater than PCD+delta[EWT] or not, delta[EWT] being a prescribed exclusion duration. If not in step E4 (a first frame received), the equipment Eqpt moves to step E5. If so in step E4 (no frame received), the equipment Eqpt moves to step E9.

During step E5, the equipment Eqpt waits in the receiving mode Rcv for a correct data frame from its receiver RE or waits for a main cycle counter LPC to elapse. In case, in step E5, a correct data frame TRN from its receiver RE is detected (which may for example be the correct preamble PR of the detected frame TRN and detected field SOF of the frame TRN, as illustrated in FIG. 9, case YES in FIG. 16), the equipment Eqpt moves to step E6. In case, in step E5, no correct data frame TRN from its receiver RE is detected (case NO in FIG. 16, for example in the case of abnormal traffic), the equipment Eqpt remains in this step E5. In case, in step E5, no receiving activity is detected, corresponding to correct data frames TRN or not, and in case the main cycle counter LPC has elapsed, the equipment Eqpt moves to step E9.

During step E6, the equipment Eqpt extracts the incremental identification D_PID from the received frame TRN and examines whether the extracted incremental identification D_PID is correct. If so in step E6, the equipment Eqpt moves to step E7. If not in step E6 (case where the extracted incremental identification D_PID is abnormal), the equipment Eqpt goes back to step E5.

During step E7, the equipment Eqpt determines the time of beginning IDF of its local emission time window Ftle according to what has been described above from the incremental identification D_PID extracted from the received frame TRN and from its own incremental identification L_PID. The equipment Eqpt starts a time local counter LPT. When the time of beginning IDF of the local emission time window Ftle has been calculated, step E7 is followed by step E8. If the time of beginning IDF of the local emission time window Ftle could not be calculated in step E7, the equipment Eqpt goes back to step E5.

During step E8, the equipment Eqpt waits for its counter LPT to reach the time of beginning IDF of the local emission time window Ftle or for the counter LPC to reach the maximum duration PCD of the cycle. When in step E8 the counter LPT has reached the time of beginning IDF of the local emission time window Ftle or when the counter LPC has reached the maximum duration PCD of the cycle (case YES in step E8), the one of these two events arriving earlier being taken into account, the equipment Eqpt goes back to step E9.

When in step E8 the counter LPT has reached the time of beginning IDF of the local emission time window Ftle or when the counter LPC has reached the maximum duration PCD of the cycle in the presence of another frame received by its receiver RE before this time IDF or before the end of this duration PCD (case ACT in step E8), the equipment Eqpt goes back to step E3.

During step E9 carried out following step E8, the equipment Eqpt starts the emission mode Xmit of its data frame TR, starts its window Flte, having been determined during step E7, from its time of beginning IDF, having been determined during step E7, and restarts its counter LPC. During step E9 carried out following step E4, the equipment Eqpt restarts its main cycle counter LPC and starts the emission mode Xmit of its data frame TR, this equipment Eqpt then being the first equipment EqptN as described in the example above, as in the case of the cycle CP1 of FIG. 5.

Following step E9, the equipment moves to step E10.

During step E10, the equipment Eqpt emits in the emission mode Xmit its data frame TR during the emission duration MTD of its window Ftle, then moves to step E11.

During step E11, the equipment Eqpt stops its emission mode Xmit of its data frame TR when the emission duration MTD of its window Ftle has elapsed. During step E11, the equipment Eqpt stops its emission mode Xmit of its data frame TR when it has detected an abnormal transmission of this frame TR (case ABN). The equipment Eqpt then moves from step E11 to step E5.

According to one embodiment of the invention, the determined function giving the respective time of beginning IDF1, . . . , IDFN−1, IDFN+1, . . . , IDFN+X of the respective local emission time window Ftle1, . . . , FtleN−1, FtleN+1, . . . , FtleN+x of each second communication equipment Eqpt1, . . . , EqptN−1, EqptN+1, . . . , EqptN+x is a linear or affine function, increasing with respect to the difference E equal to the incremental identification L_PID of the respective second communication equipment Eqpt1, . . . , EqptN−1, EqptN+1, . . . , EqptN+x (having received the first data frame TrN) from which is subtracted the incremental identification D_PID of the first communication equipment EQptN, contained in the first data frame TrN. This function can be linear or affine, and increasing piecewise with respect to the difference E.

According to one embodiment of the invention (called first version), the respective local emission time windows Ftle1, . . . , FtleN−1, FtleN, FtleN+1, . . . , FtleN+x of the communication equipments Eqpt1, . . . , EqptN−1, EqptN, EqptN+1, . . . , EqptN+x each have the same duration STD from their respective time of beginning IDF1, . . . , IDFN−1, IDFN+1, . . . , IDFN+X, as shown in the examples of FIGS. 4 to 7, 14 and 15. The emissions are thus made according to a single fixed size basis for all the equipments Eqpt. The communication protocol is thus very simple, the configuration elements are thus highly reduced.

According to one embodiment of the invention (second version), the respective local emission time windows Ftle1, . . . , FtleN−1, FtleN, FtleN+1, . . . , FtleN+x of the communication equipments Eqpt1, . . . , EqptN−1, EqptN, EqptN+1, . . . , EqptN+x each may not have the same duration STD from their respective time of beginning IDF1, . . . , IDFN−1, IDFN+1, . . . , IDFN+X, but may have a duration STD that can be assigned respectively to the respective local emission time windows Ftle1, . . . , FtleN−1, FtleN, FtleN+1, . . . , FtleN+x, these durations STD possibly being different between these windows Ftle1, . . . , FtleN−1, FtleN, FtleN+1, . . . , FtleN+x. The maximum of the duration STD of each respective local emission time window Ftle1, . . . , FtleN−1, FtleN, FtleN+1, . . . , FtleN+x is prescribed at a value MTD. This allows adapting to the needs of the equipment, in particular of the amount of data that the equipment must emit. Thus, FIG. 8 shows another example of several successive main cycles CP, where the receiving modes Rcv have not been shown although present and where the first communication equipment is the equipment EqptN, as described above, but with durations STD of the respective local emission time windows Ftle1, . . . , FtleN−1, FtleN, FtleN+1, . . . , FtleN+x, different from each other.

According to one embodiment of the invention, a time interval GT, identical for the second communication equipments Eqpt1, . . . , EqptN−1, EqptN+1, . . . , EqptN+x, is prescribed between the consecutive data frames Tr1, . . . , TrN−1, TrN+1, . . . , TrN+x.

According to one embodiment of the invention, the difference E is equal to:

$$E = L\_PID - D\_PID.$$

In case the difference E is positive, the determined function IDF giving the respective time of beginning IDF1, . . . , IDFN−1, IDFN+1, . . . , IDFN+x of the local emission time window Ftle1, . . . , FtleN−1, FtleN+1, . . . , FtleN+x of each second communication equipment Eqpt1, . . . , EqptN−1, EqptN+1, . . . , EqptN+x is equal to $$IDF = E \cdot (STD + GT) - PMAC + REF,$$

where STD is the same prescribed duration of each local emission time window Ftle1, . . . , FtleN−1, FtleN+1, . . . , FtleN+x of the second communication equipment Eqpt1, . . . , EqptN−1, EqptN+1, . . . , EqptN+x from its respective beginning time IDF1, . . . , IDFN−1, IDFN+1, . . . , IDFN+X, PMAC is a prescribed duration, equal to a part of the duration of a header of the data frame Tr1, . . . , TrN−1, TrN+1, . . . , TrN+x emitted respectively by the second communication equipment Eqpt1, . . . , EqptN−1, EqptN+1, . . . , EqptN+x, REF is a reference time, equal to the time of beginning of the emission mode Xmit of the first communication equipment EqptN, during which this first communication equipment EQptN emitted the first data frame TrN.

In case the difference E is negative, the determined function IDF giving the respective time of beginning IDF1, . . . , IDFN−1, IDFN+1, . . . , IDFN+x of the local emission time window Ftle1, . . . , FtleN−1, FtleN+1, . . . , FtleN+x of each second communication equipment Eqpt1, . . . , EqptN−1, EqptN+1, . . . , EqptN+x is equal to:

$$IDF = (TSN + E) \cdot (STD + GT) - PMAC + REF,$$

where TSN is the total number of communication equipments Eqpt1-EqptN+x (for example TSN=N+x in the examples represented in FIGS. 1 to 16).

This embodiment allows a simple determination of the emission beginning time by using a minimum configuration (on PCD, STD and TSN) identical for each of the equipments. This embodiment can be implemented as follows by the equipment Eqpt:

continuous listening—detection of a correct emission of the frames of other equipments(s), determination of the D_PID(s) in the frames received with consolidation, elaboration of the local emission beginning time IDF by deduction from the L_PID of the equipment Eqpt and from the D_PID(s) of the basic equipment Eqpt according to the last correctly decoded and accepted D_PID, function of the difference E=[L_PID-D_PID] modulo TSN, if D_PID<L_PID therefore E positive, opening of the local emission window at the emission beginning time IDF=E·(STD+GT)−PMAC+REF, with PMAC=20 bytes+delta1 with respect to the frame associated with the D_PID taken as a reference;

delta 1 being the technological latency of detection and consolidation of a D_PID by a equipment Eqpt, GT=(12+2) bytes; with 2 bytes for a drift and propagation margin (round-trip propagation time).

if D_PID>L_PID therefore E negative, opening of the local emission window at the emission beginning time IDF with consideration of a reference of the previous CP cycle according to IDF=(TSN+E)·(STD+GT)−PMAC+REF=(TSN−[ab E])×(STD+GT)−PMAC+REF, with PMAC=20 bytes+delta1 with respect to the frame associated with the D_PID taken as a reference;

delta1 being the technological latency of detection and consolidation of a D_PID by a subscriber equipment GT=(12+2) bytes; with 2 bytes for a drift and propagation margin (round-trip propagation time).

According to one embodiment of the invention, all the local emission time windows Ftle1, . . . , FtleN−1, FtleN, FtleN+1, . . . , FtleN+x have the same duration of: MTD (=STD)+GT.

If all the equipments Eqpt emit with identical MTD, the minimum non-emission duration GC corresponds to a margin (of non-activity) with respect to the duration; that is to say GC is equal to the duration PCD from which is subtracted the sum of the durations MTD for the equipments Eqpt1, . . . , EqptN−1, EqptN, EqptN+1, . . . , EqptN+x.

According to one exemplary embodiment, for a data rate of 10 Mbits/s (where 1 bit lasts 100 ns, 1 byte lasts 800 ns), for MTD=300 bytes (comprising 256 bytes of useful data), TSN=32 (or more) for a cycle of duration PCD=10 ms, TSN=20 for a cycle of duration PCD=5 ms, TSN=10 for a cycle of duration PCD=2.5 ms, TSN=4 for a cycle of duration PCD=1 ms, TSN=2 for a cycle of duration PCD=500 microseconds. For a data rate of 10 Mbits/s (where 1 bit lasts 100 ns, 1 byte lasts 800 ns), for MTD=84 bytes (comprising 46 bytes of useful data), TSN=32 (or more) for a cycle of duration PCD=10 ms, TSN=32 (or more) for a cycle of duration PCD=5 ms, TSN=32 (or more) for a cycle of duration PCD=2.5 ms, TSN=14 for a cycle of duration PCD=1 ms, TSN=7 for a cycle of duration PCD=500 microseconds.

According to one embodiment of the invention according to the second version, illustrated in FIG. 10, the determined function giving the respective time of beginning IDF1, . . . , IDFN−1, IDFN+1, . . . , IDFN+X of the respective local emission time window Ftle1, . . . , FtleN−1, FtleN+1, . . . , FtleN+x of each second communication equipment Eqpt1, . . . , EqptN−1, EqptN+1, . . . , EqptN+x comprises a table TGP (for example emission time position table TGP), which is recorded in each second communication equipment Eqpt1, . . . , EqptN−1, EqptN+1, . . . , EqptN+x and which explicitly gives the time of beginning IDF1, . . . , IDFN−1, IDFN+1, . . . , IDFN+X (the LPTs in FIG. 10) of the local emission time window Ftle1, . . . , FtleN−1, FtleN+1, . . . , FtleN+x of each second communication equipment Eqpt1, . . . , EqptN−1, EqptN+1, . . . , EqptN+x according to the incremental identification L_PID of the second communication equipment Eqpt1, . . . , EqptN−1, EqptN+1, . . . , EqptN+x and according to the incremental identification D_PID of the first communication equipment EQptN, contained in the first data frame TrN. This embodiment provides certainty on the overall consistency of the communication device.

According to one embodiment of the invention according to the second version, illustrated in FIG. 11, the determined function giving the respective time of beginning IDF1, . . . , IDFN−1, IDFN+1, . . . , IDFN+X of the local emission time window Ftle1, . . . , FtleN−1, FtleN+1, . . . , FtleN+x of each second communication equipment Eqpt1, . . . , EqptN−1, EqptN+1, . . . , EqptN+x comprises a sequencing table TGS, which is recorded in each second communication equipment Eqpt1, . . . , EqptN−1, EqptN+1, . . . , EqptN+x for each incremental identification L_PID, which gives a sequencing order ORD (equal to a, b, c, d . . . , z in FIG. 11) of the local emission time windows Ftle1, . . . , FtleN−1, FtleN+1, . . . , FtleN+x of the second communication equipments Eqpt1, . . . , EqptN−1, EqptN+1, . . . , EqptN+x according to the difference E and which gives the duration STDa, STDb, STDc, STDd, . . . STDz of each local emission time window Ftle1, . . . , FtleN−1, FtleN+1, . . . , FtleN+x according to the incremental identification L_PID of each second communication equipment Eqpt1, . . . , EqptN−1, EqptN+1, . . . , EqptN+x. The respective time of beginning IDF1, . . . , IDFN−1, IDFN+1, . . . , IDFN+X of the local emission time window Ftle1, . . . , FtleN−1, FtleN+1, . . . , FtleN+x is determined by each second communication equipment Eqpt1, . . . , EQptN−1, EqptN+1, . . . , EqptN+x at least from the durations STD of the local emission time windows Ftle1, . . . , FtleN−1, FtleN+1, . . . , FtleN+x and from the sequencing order ORD. The table TGS thus gives the chain pattern ORD of the emissions in the main cycle CP with the maximum size STDa, STDb, STDc, STDd, . . . STDz of each emission of each equipment Eqpt. The duration STDa, STDb, STDc, STDd, . . . STDz of each local emission time window Ftle1, . . . , FtleN−1, FtleN+1, . . . , FtleN+x remains less than or equal to MTD.

According to one embodiment of the invention, illustrated by way of example in FIGS. 13 and 14, at least one Eqpty of the second communication equipments Eqpt1, . . . , EqptN−1, EqptN+1, . . . , EqptN+x, called third communication equipment Eqpty has several respective incremental identifications L_PIDy_1, . . . , L_PIDy_M, which are determined real values different from each other. Each third communication equipment Eqpty prescribes several respective local emission time windows Ftley_1, . . . , Ftley_M, which are respectively associated with its respective incremental identifications L_PIDy_1, . . . , L_PIDy_M and during which the third communication equipment Eqpty is put into the emission mode Xmit of respectively several data frame(s) Try_1, . . . , Try_M. Each third communication equipment Eqpty prescribes the respective time of beginning IDFy_1, . . . , IDFy_M of each respective local emission time window Ftley_1, . . . , Ftley_M of the third communication equipment Eqpty as being equal to the determined function, increasing with respect to the difference E equal to the respective incremental identification L_PIDy_1, . . . , L_PIDy_M of the third communication equipment Eqpty from which is subtracted the incremental identification D_PID of the first communication equipment EQptN, contained in the first data frame TrN, the respective local emission time windows Ftley_1, . . . , Ftley_M being disjoint. Each third communication equipment Eqpty is put, for each of its respective incremental identifications L_PIDy_1, . . . , L_PIDy_M, into the emission mode Xmit during which the third communication equipment Eqpty emits its data frame Try_1, . . . , Try_M, containing the respective incremental identification L_PIDy_1, . . . , L_PIDy_M of the third communication equipment Eqpty, during its respective local emission time window Ftley_1, . . . , Ftley_M starting at the time of beginning IDFy_1, . . . , IDFy_M of this respective local emission time window Ftley_1, . . . , Ftley_M. The respective incremental identifications L_PIDy_1, . . . , L_PIDy_M can be established by the third equipment Eqpty from the unique physical position of this third equipment Eqpty. Thus, the third equipment Eqpty, when activated in the emission mode Xmit, will emit several Try_1, . . . , Try_M data frames in the same main cycle.

Thus, according to one embodiment of the invention, the basic operation of the equipments Eqpt described above (namely their attachment unit RAC in FIG. 1 and their attachment units RAC1, RAC2 in FIGS. 2 and 3) is in half-duplex: a single equipment transmitting emits in each elaborated emission window. Half-duplex equipments Eqpt thus operate in a CSMA/CA (carrier sense multiple access/collision avoidance) mode and not in CSMA/CD (carrier sense multiple access/collision detection mode, which means multiple access with listening of the carrier and with detection of collision).

According to one extended embodiment of the invention, the operation of two of the equipments Eqpt (namely their attachment unit RAC in FIG. 1 and their attachment units RAC1, RAC2 in FIGS. 2 and 3) is full duplex only during their pre-established local emission time window, which are therefore simultaneous on the pair CAB of FIG. 1 or on the pairs CAB1 and CAB2 of FIGS. 2 and 3 between members of the pair of equipments Eqpt also pre-established exclusively and both connected to the pair CAB or to the two pairs CAB1 and CAB2, the other equipments operating in half-duplex. At least one (or several) of the windows of this/these other piece(s) of equipment operates in half-duplex.

The attachment units RAC, RAC1, RAC2 operating in duplex are for example according to the IEEE802.3cg standard, part 147.4, having a duplex interface in its physical medium attachment sublayer (namely in this attachment unit RAC, RAC1, RAC2). In this case, the attachment unit RAC, RAC1, RAC2 operating in duplex is configured to discriminate the data frame emitted by the transmitter EM of the equipment Eqpt having this attachment unit RAC, RAC1, RAC2 vis-à-vis the data frame, which is received by the receiver RE of the equipment Eqpt having this attachment unit RAC, RAC1, RAC2 coming from another equipment. These frames are not identical, due in particular to their incremental identifications different from each other. During this discrimination, the principle implemented by the equipment Eqpt attachment unit RAC, RAC1, RAC2 operating in duplex can be based on echo cancellation.

For example, in FIG. 15, the pair of equipments EqptN+1 and EqptN+x operates in duplex with each other during their pre-established local emission time window FtleN+1,N+x on the pair CAB of FIG. 1 or on the pairs CAB1 and CAB2 of FIG. 2 or 3: the transmitter EM of the equipment EqptN+1 emits in the emission mode Xmit the frame TrN+1 during the pre-established local emission time window FtleN+1,N+x, the transmitter EM of the equipment EqptN+x emits in the emission mode Xmit the frame TrN+x during the pre-established local emission time window FtleN+1,N+x, the receiver RE of the equipment EqptN+1 receives in the receiving mode Rcv the frame TrN+x during the pre-established local emission time window FtleN+1,N+x, the receiver RE of the equipment EqptN+x receives in the receiving mode Rcv the frame TrN+1 during the pre-established local emission time window FtleN+1,N+x. Similarly, in FIG. 15, the pair of equipments Eqpt1 and Eqpt2 operates in duplex with each other during their pre-established local emission time window Ftle1,2 on the pair CAB of FIG. 1 or on the pairs CAB1 and CAB2 of FIG. 2 or 3. In FIG. 15, the pair of equipments Eqp4 and Eqpt5 operate in duplex with each other during their pre-established local emission time window Ftle4,5 on the pair CAB in FIG. 1 or the pairs CAB1 and CAB2 in FIG. 2 or 3. In FIG. 15, the other equipments EqptN, Eqpt3, Eqpt6 and EqptN−1 operate in half-duplex during their local emission time window FtleN, Ftle3, Ftle6 and FtleN−1 on the pair CAB in FIG. 1 or on the pairs CAB1 and CAB2 in FIG. 2 or 3. The pair of duplex equipments can be identical or different from one pre-established window on the other of the same data exchange system. An equipment associated with a duplex window can belong to another half-duplex window. There is only one active duplex window at a time. The opening of a pre-established duplex window prohibits the simultaneous activation of another window in duplex during the same window.

The invention thus allows obtaining a next-generation of fieldbuses CAB that is more efficient than the different current types. The invention is more homogeneous but does not add intermediate resources at the physical layer level (passive cable network) and uses a deterministic fieldbus CAB. The pair CAB can be of the local network type, for example of the Ethernet type, for example at 10 Mbit/s single-pair. In the case of this rate-distance performance multi-drop physical layer (10 Mbit/s for a length of the pair from 25 m for example, or from 10 meters to a few tens of meters, for example from 15 m to 25 m, short-periodicity frames (class of the ms)) adapted for the targeted perimeter (Intra-System communication), the invention allows improving the protocol described at the Std 802.3cg group level for the media sharing (level 2), for the on-board avionics systems in terms of simplification, robustness while guaranteeing the determinism of the exchanges. The physical layer can be for example of the 10 Base-T1S type.

The invention allows a deterministic protocol for an Ethernet-based data exchange system which will allow providing a homogeneous response to the replacement of current on-board fieldbuses without addition of specific equipment based on a multi-transmitter capacity. The invention allows an operation with a single twisted pair CAB and this in multi-users (transceivers) attached passively via the sections ST or operation on a multi-drop line according to the standard under establishment IEEE 802.3cg or 10Base-T1S. The invention uses this new physical layer to respond to a perimeter of the fieldbus category and this with a solution performing a time organization of the emissions without collision and guaranteeing the determinism of the exchanges without calling on a particular user or equipment which would act as a bus or coordinator controller. The invention dispenses with the addition of intermediate network equipments of the switch or concentrator type.

The invention allows an addition of localized wired logic algorithms in each of the attachment units of the equipments Eqpt: MAC level complements because determining the temporal organization of the frames and operating at the elementary frame level. The invention uses an activity listening and current transmitter identification approach CSMA/CA for the determination of the time of beginning of the emission of each equipment Eqpt connected on the pair CAB via its attachment unit RAC. The invention allows autonomy as to the determination of the time of beginning of the emission of each equipment Eqpt, avoiding the implementation of a dedicated equipment and of a specific traffic, unlike the IEEE802.3cg standard. The invention allows autonomy of the emissions in accordance with the determinism of each exchange without dedicated equipments for their monitoring or coordination operations. The invention allows dispensing with a clock, a central and explicit time reference and a central time phasing. The invention provides transparency for the use outside the configuration of the new parameters implemented by the complements. These complements correspond to a decision-making protocol for the emission of each equipment having this attachment unit allowing deterministic emission access without using a dedicated equipment, unlike the IEEE802.3cg standard. The invention provides a specific protocol that can be implemented according to different variants depending on the use contexts/constraints (for example fixed and unique frame size for all the equipments Eqpt or not with frame size assignable per equipments Eqpt); implementation of duplex windows. The invention provides better fault tolerance than the IEEE802.3cg standard. The invention provides a simpler configuration than the IEEE802.3cg standard. The invention allows limiting the complexity of implementation of the physical layer part of the IEEE802.3cg standard. The invention provides full control of the bus CAB access protocol, of its implementation and of the performances, unlike the IEEE802.3cg standard. The invention allows more immediate certification than the IEEE802.3cg standard.

The invention allows standardization of the current fieldbuses and standardization of the frame formats on a homogeneous deterministic basis consistent with the standard choices of infrastructure networks. The invention allows a simplification of the gateways with the core or backbone network, as well as a simplification of the gateways within the same system between different parts of this system (without passing through the core network). The invention allows eventually replacing n different types of fieldbuses.

The protocol according to the invention can be executed in the attachment unit of each of the subscriber equipments sharing the same medium (main cable CAB) or data exchange system. The invention allows an additional configurable wired logic MAC level protocol (MAC-ADD) directly associated with the frame encoder and decoder in Ethernet format.

The architecture of the communication equipment Eqpt can be of the single chain type or of the master-checker type. In particular, the additional module MAC-ADD can be of the master-checker type. The master-checker type uses a master processor and a checker processor, which is synchronized with the master processor and performs the same operations as the master processor. The checker processor compares its own calculations with the outputs calculated by the master processor and sends an alarm signal to the master processor in case of divergence between its calculations and the outputs calculated by the master processor. This allows an increase in the integrity of the implementation of the emission law and therefore of the decision of an equipment Eqpt to emit. Different implementation architectures, for example different Master-Checker structures depending on the integrity objective or the availability objective of the data exchange system; applicable system by data exchanges system are possible and can be integrated for example in the terminal part supporting the attachment unit RAC for an equipment Eqpt.

Of course, the embodiments, characteristics, possibilities and examples described above can be combined with each other or selected independently of each other.

The invention claimed is:

1. A method for communicating data between a plurality of communication equipments present on an on-board device, the communication equipments being connected to at least one pair of communication conductors,
wherein
each communication equipment, when activated, is by default in a receiving mode, in which it is able to receive at least one data frame on the pair of communication conductors and is able to be put in an emission mode, in which it emits a data frame on the pair of communication conductors,
each communication equipment has at least one incremental identification, which is a determined real value, the incremental identifications being different from each other,
at least one of the communication equipments, called first communication equipment is activated and put into the emission mode, during which the first communication equipment emits on the pair of communication conductors the data frame containing the incremental identification of the first communication equipment, called first data frame, while each communication equipment, other than the first communication equipment, called second communication equipment, is activated and put into receiving mode, then the first communication equipment is put into receiving mode,
each second communication equipment, prescribes its local emission time window, which is associated with its incremental identification, during which the second communication equipment is put into emission mode for its data frame,
a time of beginning of the local emission time window of each second communication equipment being a determined function, increasing with respect to a difference equal to the incremental identification of the second communication equipment from which is subtracted the incremental identification of the first communication equipment, contained in the first data frame,
the local emission time windows being disjoint,
each second communication equipment is put, for its incremental identification, into emission mode during which the second communication equipment emits on the pair of communication conductors its data frame, containing the incremental identification of the second communication equipment, during its local emission time window starting at the time of beginning of this local emission time window.

2. The method according to claim 1, wherein the determined function giving the time of beginning of the local emission time window of each second communication equipment is a linear or affine function, increasing with respect to the difference contained in the first data frame.

3. The method according to claim 1, wherein the determined function giving the time of beginning of the local emission time window of each second communication equipment is a linear or affine function, increasing piecewise with respect to the difference (E) contained in the first data frame.

4. The method according to claim 1, wherein the local emission time windows of the second communication equipments each have the same duration from their time of beginning.

5. The method according to claim 1, wherein a time interval, identical for the second communication equipments, is prescribed between the data frames following each other.

6. The method according to claim 1, wherein the difference E is equal to:

$$E = L\_PID - D\_PID,$$

where L_PID is the incremental identification of the second communication equipment,
D_PID is the incremental identification of the first communication equipment, contained in the first data frame,
the incremental identifications L_PID and D_PID are positive integers following each other,
in case the difference E is positive, the determined function IDF giving the time of beginning of the local emission time window of each second communication equipment is equal to:

$$IDF = E \cdot (STD + GT) - PMAC + REF,$$

where STD is a prescribed duration of the local emission time window of the second communication equipment from its time of beginning and is identical for the local emission time windows of the second communication equipments, GT is a prescribed time interval between the data frames following each other and is identical for the second communication equipments, PMAC is a prescribed duration, equal to part of the duration of a header of the data frame of the second communication equipment, REF is a reference time, equal to the time of beginning of the emission mode of the first communication equipment, and in case the difference E is negative, the determined function IDF giving the time of beginning of the local emission time window of each second communication equipment is equal to:

$$IDF=(TSN+E)\cdot(STD+GT)-PMAC+REF,$$

where TSN is the total number of communication equipments.

7. The method according to claim 1, wherein the determined function giving the time of beginning of the local emission time window of each second communication equipment comprises a table, which is recorded in each second communication equipment and which gives the time of beginning of the local emission time window of each second communication equipment according to the incremental identification of the second communication equipment and according to the incremental identification of the first communication equipment, contained in the first data frame.

8. The method according to claim 7, wherein a time interval, identical for the second communication equipments, is prescribed between the data frames following each other.

9. The method according to claim 7, wherein the local emission time windows of the second communication equipments each have the same duration from their time of beginning.

10. The method according to claim 1, wherein the determined function giving the time of beginning of the local emission time window of each second communication equipment comprises a sequencing table, which is recorded in each second communication equipment, which gives a sequencing order of the local emission time windows of the second communication equipments according to the difference equal to the incremental identification of the second communication equipment from which is subtracted the incremental identification of the first communication equipment, contained in the first data frame, and which gives the duration of each local emission time window depending on the incremental identification of each second communication equipment, the time of beginning of the local emission time window being determined by each second communication equipment at least from the durations of the local emission time windows and from the sequencing order.

11. The method according to claim 1, wherein at least one of the second communication equipments, called third communication equipment, has several respective incremental identifications, which are determined real values different from each other, each third communication equipment prescribes several respective local emission time windows, which are respectively associated with its respective incremental identifications and during which the third communication equipment is put into emission mode of respectively several data frames, a time of beginning of each respective local emission time window of the third communication equipment being a determined function, increasing with respect to a difference equal to the respective incremental identification of the third communication equipment from which is subtracted the incremental identification of the first communication equipment, contained in the first data frame, the respective local emission time windows being disjoint, each third communication equipment is put, for each of its respective incremental identifications, into emission mode during which the third communication equipment emits its data frame, containing the respective incremental identification of the third communication equipment, during its respective local emission time window starting at the time of beginning of this respective local emission time window.

12. The method according to claim 1, wherein a pre-established pair of two of the communication equipments operates in duplex during their local emission time windows which are simultaneous.

13. The method according to claim 1, wherein a first pre-established pair of two of the communication equipments operates in duplex during their first local emission time windows, which are simultaneous, and at least a second pre-established pair of two of the communication equipments operates in duplex during their second local emission time windows, which are simultaneous, the second local emission time windows being disjoint with respect to the first local emission time windows.

14. A communication equipment, intended to be present on an on-board device, the communication equipment being intended to be connected to at least one pair of communication conductors, wherein the communication equipment is able to be activated and comprises at least one transmitter, at least one receiver, a generator and a memory, when the communication equipment is activated and when the at least one transmitter is not in an emission mode, the at least one receiver is in a receiving mode, in which the at least one receiver is able to receive at least a first data frame that has been emitted by at least one other communication equipment on the at least one pair of communication conductors and which contains at least a first incremental identification of the other communication equipment, the communication equipment has at least a second incremental identification, which is recorded in the memory of the communication equipment, the first incremental identification and the second incremental identification being determined real values different from each other, when the communication equipment is activated, the transmitter is able to be put into emission mode, in which the at least one transmitter emits on the at least one pair of communication conductors during a local emission time window of the communication equipment a second data frame generated by the generator and containing the second incremental identification, the communication equipment comprising a computer configured to prescribe the local emission time window, which is associated with its second incremental identification, the computer being configured to prescribe a time of beginning of the local emission time window of the communication equipment as being a determined function, increasing with respect to a difference equal to the second incremental identification of the communication equipment from which is subtracted the first incremental identification contained in the first data frame.

15. A non-transitory computer-readable storage medium having a computer program, comprising code instructions that, when executed by a computer of a communication equipment, intended to be present on an on-board device, cause the computer to execute the following steps activating the communication equipment comprising at least one transmitter, at least one receiver, a generator and a memory, when the communication equipment is activated and when the transmitter is not in the emission mode, putting the at least one receiver in a receiving mode, in which the at least one receiver is able to receive at least a first data frame that has been emitted by at least one other communication equipment on a pair of communication conductors and containing at least a first incremental identification of the other communication equipment, the communication equipment having at least one second incremental identification, which is recorded in the memory of the communication equipment, the first incremental identification and the second incremental identification being determined real values different from each other, when the communication equipment is activated, putting the at least one transmitter into emission mode, in which the at least one transmitter emits on the pair of communication conductors during a local emission time window of the communication equipment a second data frame generated by the generator and containing the second incremental identification, prescribing the local emission time window, which is associated with the second incremental identification, prescribing a time of beginning of the local emission time window of the communication equipment as being a determined function, increasing with respect to a difference equal to the second incremental identification of the communication equipment from which is subtracted the first incremental identification, contained in the first data frame.

16. An on-board communication device, comprising at least one pair of communication conductors and a plurality of communication equipments according to claim 14, which are connected respectively in a plurality of positions along the at least one pair of communication conductors, the positions being different from each other along the at least one pair of communication conductors.

* * * * *